United States Patent

Furtado et al.

[11] 3,908,833
[45] Sept. 30, 1975

[54] METHOD AND APPARATUS FOR FORMING A PAIR OF TWO AND ONE-HALF BALE WIDE TIER PATTERNS

[75] Inventors: Anthony E. Furtado, Riverdale; Thomas H. Wadsworth, Selma; L. Dennis Butler, Kingsburg, all of Calif.

[73] Assignee: Sperry Rand Corporation, New Holland, Pa.

[22] Filed: May 24, 1974

[21] Appl. No.: 473,242

[52] U.S. Cl. .................... 214/6 B; 214/152
[51] Int. Cl.² ........................... B65G 57/32
[58] Field of Search ........ 214/6 B, 6 P, 10.5 S, 152, 214/518, 519

[56] References Cited
UNITED STATES PATENTS

| | | | |
|---|---|---|---|
| 3,330,424 | 7/1967 | Grey et al. | 214/6 B |
| 3,446,369 | 5/1969 | May et al. | 214/6 B |
| 3,485,397 | 12/1969 | Miskin et al. | 214/152 |
| 3,497,085 | 2/1970 | Jay et al. | 214/6 B |
| 3,528,564 | 9/1970 | Fischer | 214/6 B |
| 3,596,777 | 8/1971 | Neely, Jr. | 214/6 B |
| 3,664,519 | 5/1972 | Grey | 214/6 B |

*Primary Examiner*—Robert J. Spar
*Assistant Examiner*—Leslie J. Paperner
*Attorney, Agent, or Firm*—John R. Flanagan; Frank A. Seemar; Joseph A. Brown

[57] ABSTRACT

Crop material bales are formed into a pair of alternating, interlocking two and one-half bale wide tier patterns on a tier-forming table of a bale wagon by alternately utilizing one of a pair of elongated platforms being each pivotally mounted at its one end adjacent one of two opposing sides, and a forward bale-receiving end, of the table and displaced from each other through a distance approximately equal to the length of two and one-half bales. Each platform is moveable between a forward, bale-receiving position along the table end and a side position along its corresponding table side for forming a pair of side rail bales in one of the tier patterns. The bale wagon further has a bale-receiving table for delivering pairs of bales to the tier-forming table end and means actuated by movement of the tier-forming table for selecting one of the two platforms and causing it to move to its forward position and actuated by movement of the bale-receiving table for causing the one platform selected to move to its side position.

16 Claims, 36 Drawing Figures

U.S. Patent Sept. 30, 1975 Sheet 1 of 8 3,908,833
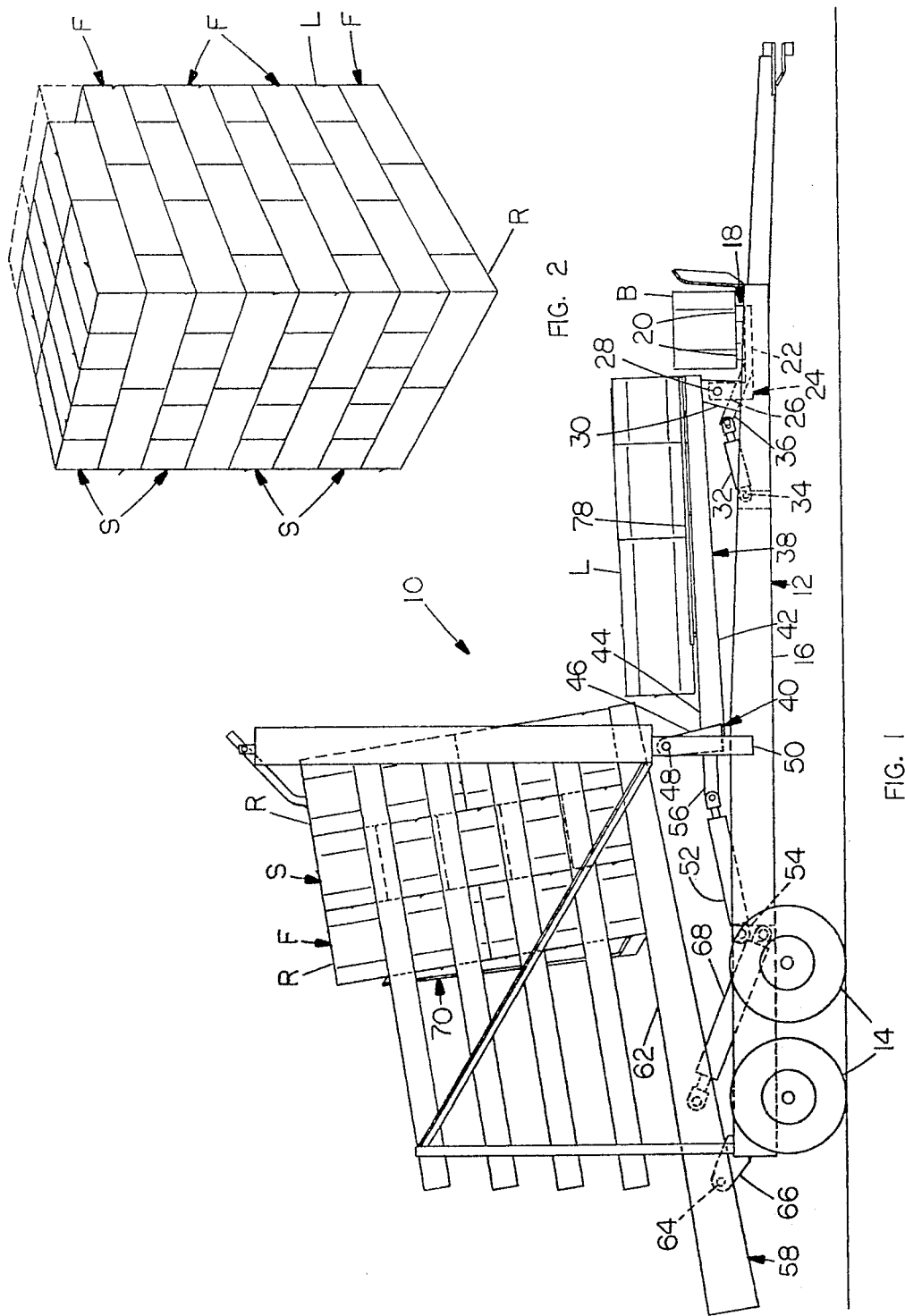

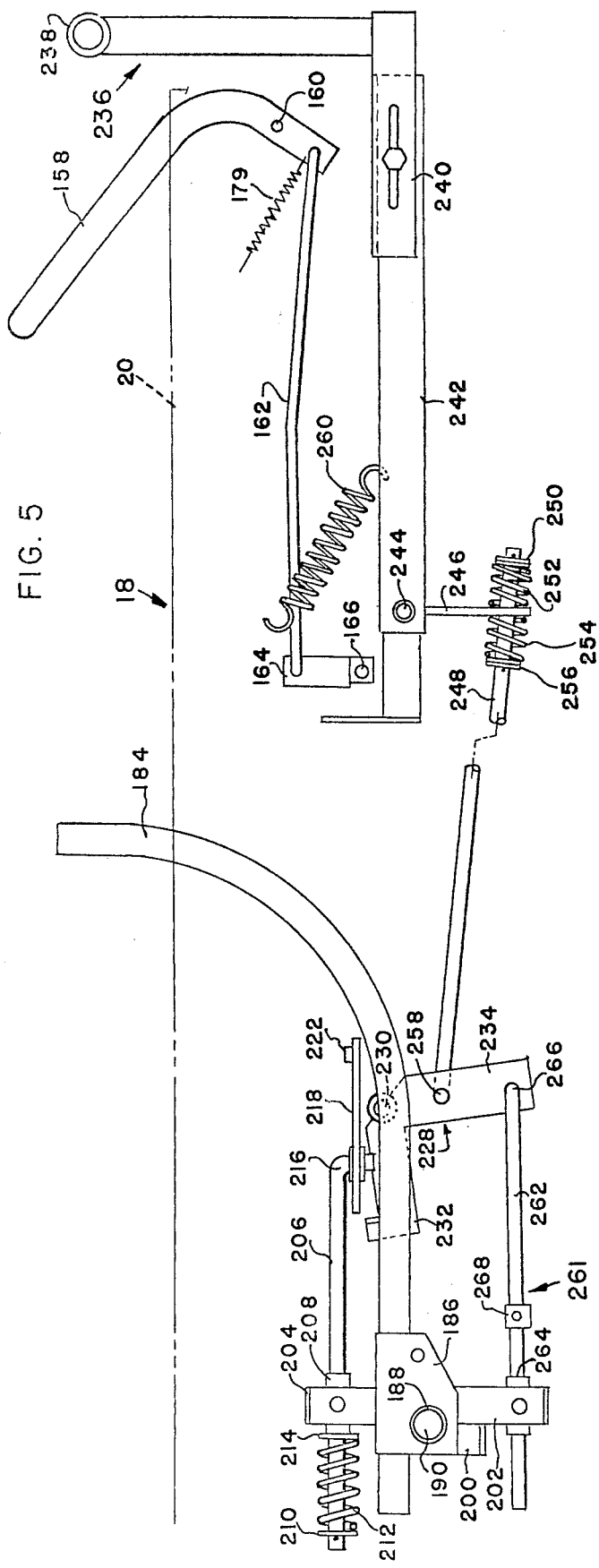
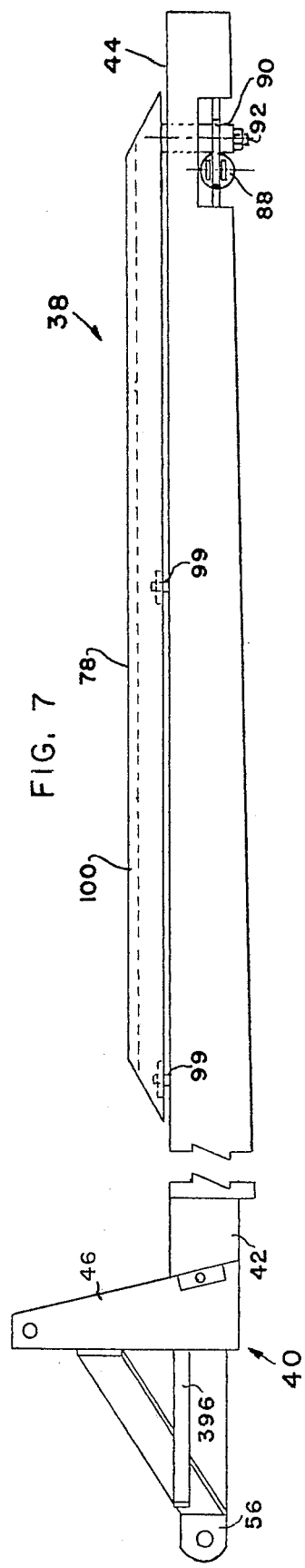

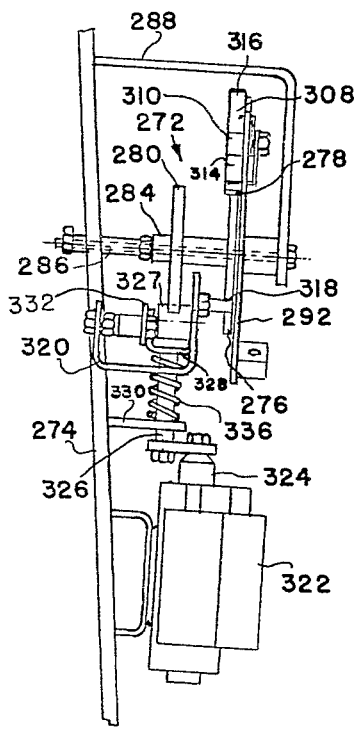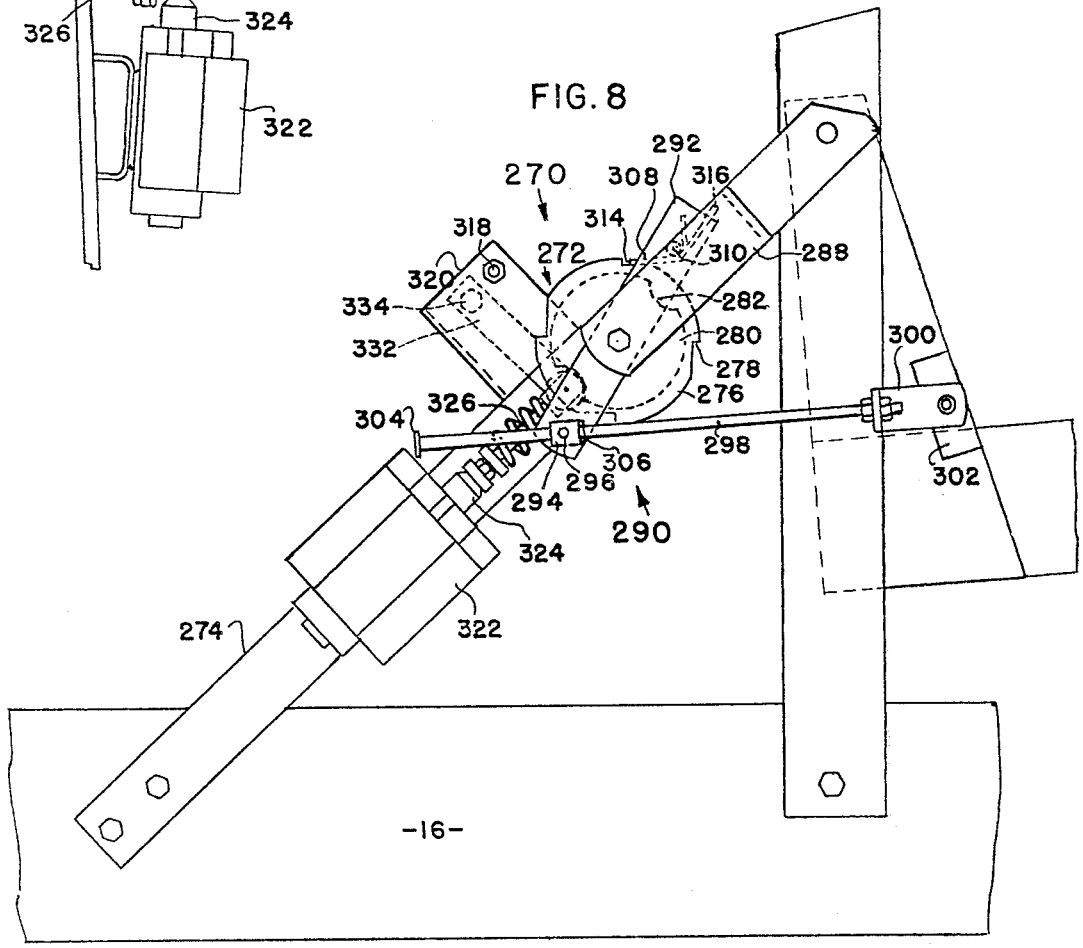

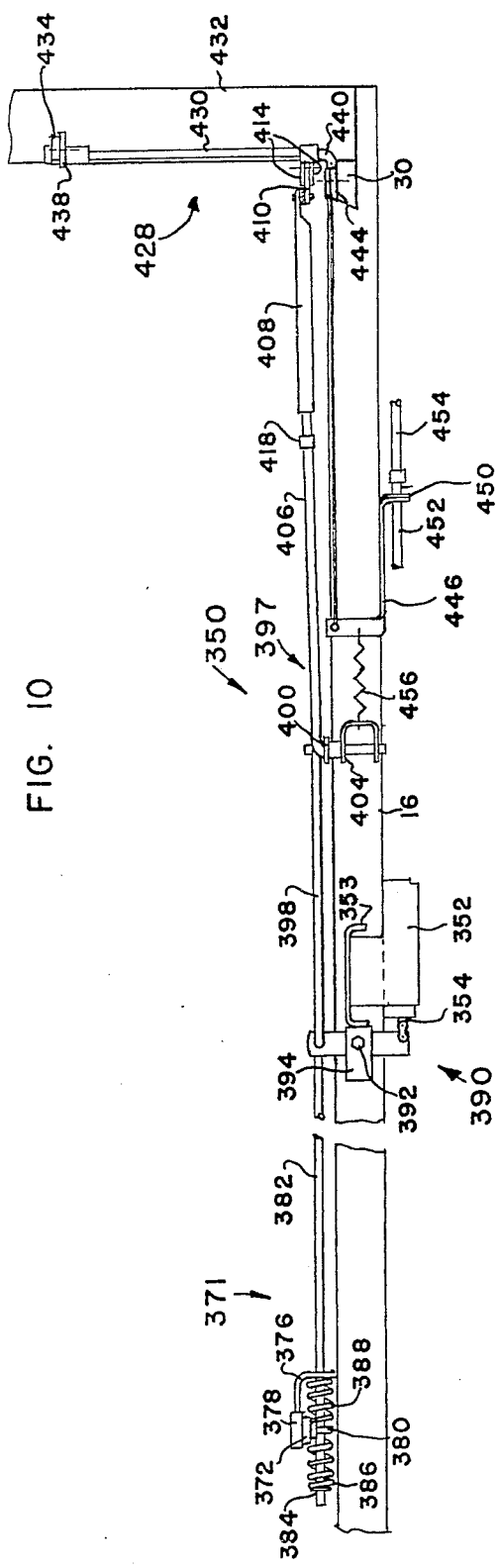
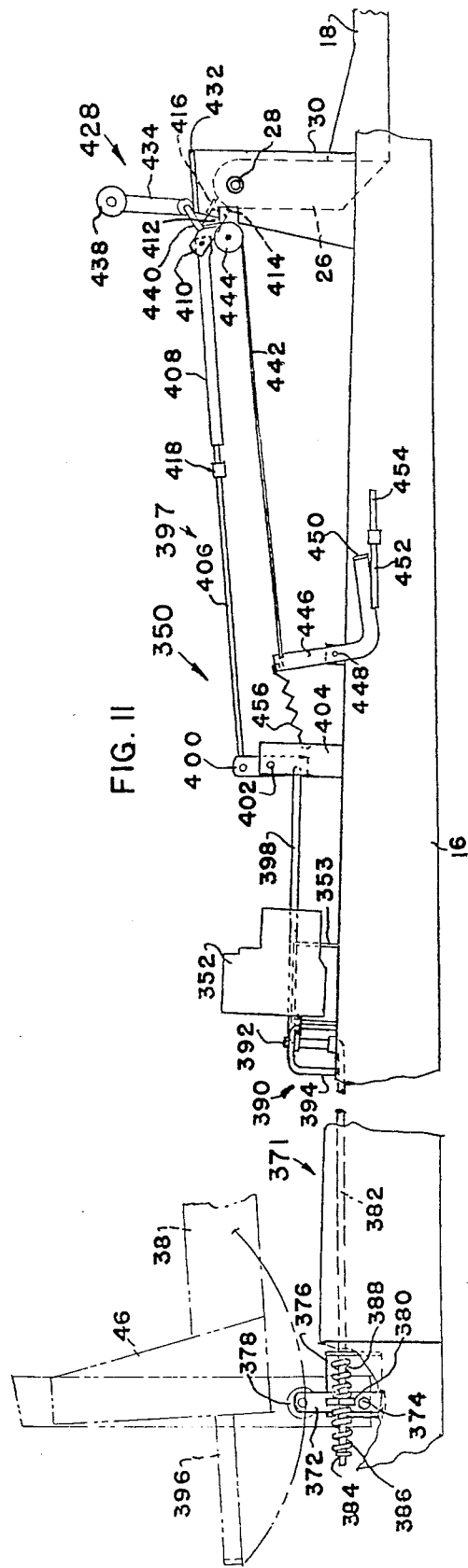

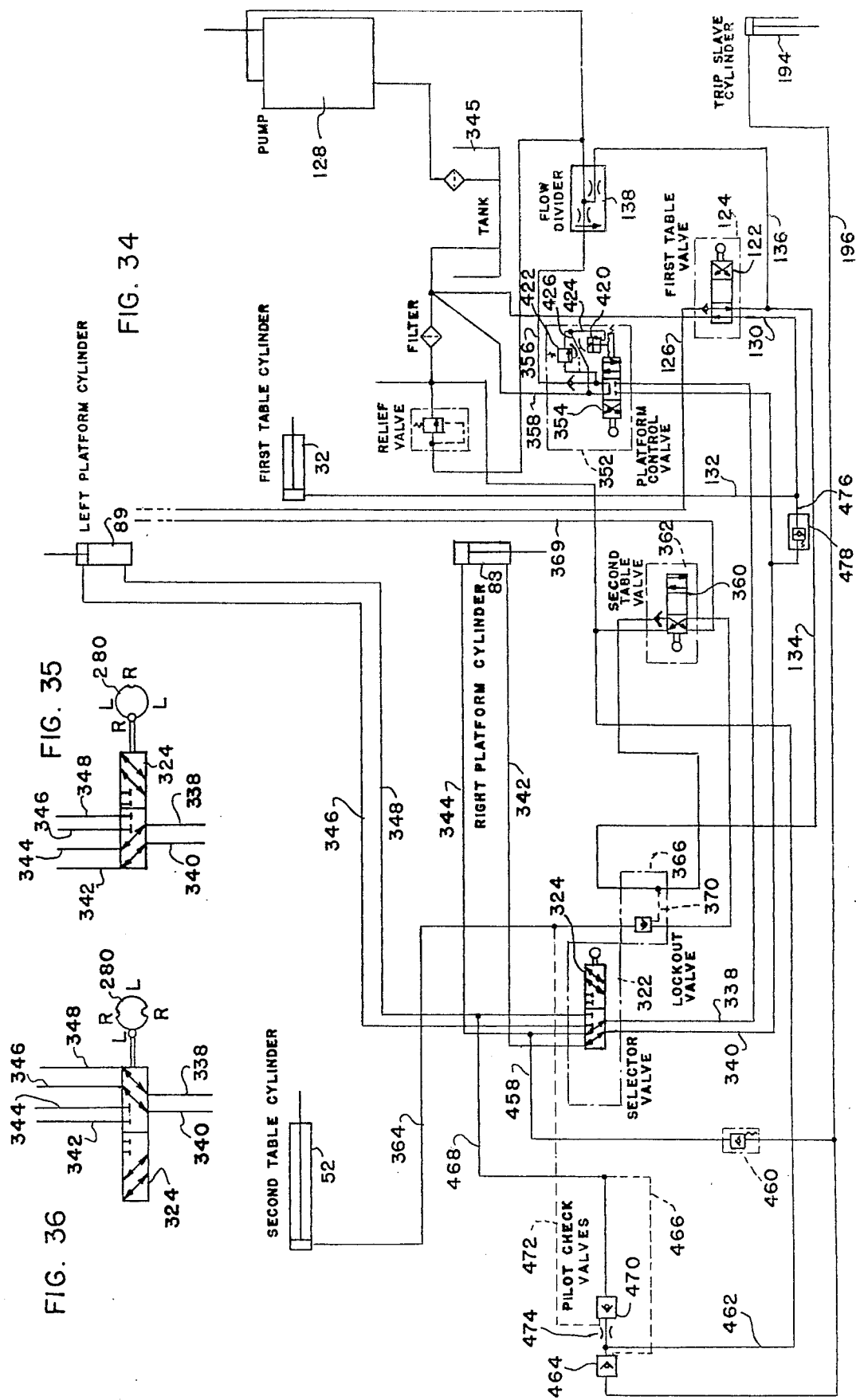

METHOD AND APPARATUS FOR FORMING A PAIR OF TWO AND ONE-HALF BALE WIDE TIER PATTERNS

CROSS REFERENCES TO RELATED APPLICATIONS

Reference is hereby made to the following co-pending U.S. applications dealing with related subject matter and assigned to the assignee of the present invention:

1. "Method and Apparatus for Forming a Pair of Two and One-Half Bale Wide Tier Patterns" by L. Dennis Butler et al, U.S. Ser. No. 473,241, filed May 24, 1974.

1. "Bale Position Sensing and Control Mechanism" by L. Dennis Butler et al, U.S. Ser. No. 473,262, filed May 24, 1974.

BACKGROUND OF THE INVENTION

1. Field of the Invention

The present invention relates generally to the art of forming a stack of crop material bales and, more particularly, is concerned with a method and apparatus for positioning bales in alternating and interlocking tier patterns on a bale wagon in forming a two and one-half bale wide stack of bales.

2. Description of the Prior Art

It is accepted present day practice to form bales of crop material such as hay or the like into stacks through the employment of an automatic bale wagon. The wagons presently generally available come in two basic sizes, namely two wide and three wide machines. In a two wide machine, the bale wagon is capale of forming a stack having a width equal to the length of two bales. Similarly, a three wide bale wagon is capable of forming a stack having a width equal to the length of three bales.

Each of the commonly used two wide and three wide machines has a first table which accumulates two or three bales being arranged end-to-end, a second table which receives bales from the first table and accumulates a plurality of layers, such as four, five or six layers, of two or three bales each, which plurality of layers are commonly called a tier of bales, and a third table or load bed which receives the tiers from the second table and accumulates a plurality of the tiers, for example seven, to form a stack thereon. Once the stack has been accumulated on the load bed, it may be unloaded by pivoting the load bed 90° and depositing the stack on the ground or the like with the first tier of bales which was previously accumulated on the second table now being the lowermost tier of the stack in contact with the ground surface.

In order to enhance the stability of the stack, it is generally desirable to provide one or more tie tiers within the stack, such being tiers having individual bales arranged to overlap two bales in adjacent tiers above and below the tie tier. This can be done either manually or automatically during formation of the stack on the bale wagon, for example, in the manner illustrated and described in U.S. Pat. No. 3,395,814 or in U.S. Pat. No. 3,664,519.

However, one disadvantage of both of the presently available two wide and three wide bale wagons is that under certain crop and terrain conditions, even the tied stacks formed by these wagons do not have the desired stability and weathering characteristic. This is apparently caused by continuous vertical splits or cleavage planes which sometimes form between bales in the stacks of these wagons and are only partially interrupted by the few tie tiers being interposed within the stacks. The presence of such splits or cleavage planes is particularly detrimental to the stability of stacks formed of bales of slippery crop material, such as coastal bermuda grass, or to the stability of stacks unloaded from the bale wagon onto uneven or hillside terrain. In order to prevent these stacks from occasionally toppling over as they weather at a storage location, it is usually necessary to provide stack poles about the stack in engagement with the ground and the sides of the stack to prop up the stack sides. The presence of such splits or cleavage planes down through the stack also diminishes the weatherability of stack by allowing moisture to penetrate down through the stack which results in a higher degree of crop material spoilage than when the moisture is restricted solely to the outer surface of the stack.

Another disadvantage of both the two wide and three wide bale wagons is that they are not adapted to provide the optimum bale capacity in a stack within the maximum highway width limitations of the laws of certain jurisdictions, such as some European countries, where the maximum width allowed is approximately two and one-half meters. Specifically, the three wide wagon and its stack both exceed the two and one-half meter highway width maximum limit, while the two wide wagon and its stack fail to utilize all of the space available within this maximum limit.

SUMMARY OF THE INVENTION

The present invention substantially overcomes the above-described disadvantage of the stacks formed by the two wide and three wide bale wagons.

First, a stack formed by the two alternating two and one-half bale wide tier patterns being formed by the present invention has substantially all of its bales interlocked together in a manner which minimizes the probability of splits or cleavage planes forming vertically through the stack which thereby enhances the stability and weatherability of the stack and generally eliminates the necessity for using stack poles to laterally support the standing stack.

Second, the two and one-half bale wagon and its stack provide the optimum utilization of the space available under the maximum highway width limitations of the laws of such European countries having the two and one-half meter maximum width restriction.

Accordingly, the present invention broadly comprises the method and apparatus for forming bales on a bale wagon into a tier pattern being approximately two and one-half bales wide. The bale wagon generally includes a pivotally-mounted tier-forming table, a pivotally-mounted bale-receiving table positioned forwardly along a bale-receiving end of said tier-forming table and an elongated platform having a length and width generally corresponding to that of a pair of bales being arranged end-to-end in a row and being pivotally mounted at its one end adjacent one of two opposite sides, and the bale-receiving end, of the tier-forming table through a distance from the other of the two sides of the tier-forming table approximately equal to the length of two and one-half bales.

In forming the tier pattern on the bale wagon, first, the tier-forming table is pivotally moved to a horizontal, tier-forming position, which movement actuates the platform to move to a forward position along the bale-receiving end of the tier-forming table. Second, the bale-receiving table is moved from a horizontal, bale-receiving position to a generally upright, bale-discharging position, when one pair of bales has been received on the table in a transverse position aligned with the platform, for placing the one pair on the platform. Then, pivotal movement of the bale-receiving table back to its horizontal position actuates the platform to pivotally move with the pair of bales thereon from its forward position to a side position along the one side of the tier-forming table for disposing the one pair in a longitudinal position to thereby form a pair or rail bales of the tier pattern. The platform is then maintained at its side position.

Finally, the bale-receiving table is successively pivotally moved from its horizontal position to its upright position and back to its horizontal position as pairs of bales in a plurality thereof, being like the one pair, are successively received on the table in another transverse position therealong, being offset from the transverse position of the one pair and aligned between the ohter side of the tier-forming table and one longitudinal side of the pair of rail bales facing the other side of the tier-forming table, for successively placing the like pair in the plurality thereof on the tier-forming table in transverse relationships along the one longitudinal side of the pair of rail bales and generally between opposite ends thereof to thereby complete the formation of the tier pattern on the tier-forming table.

More particularly, a pair of tiers is alternately formed on the bale wagon by alternately utilizing a pair of elongated platforms. Each of the platforms is pivotally mounted at its one end adjacent one of two opposing sides and the forward end of the tier-forming table and displaced from the opposite table side through a distance approximately equal to the length of two and one-half bales. One platform is utilized in forming the first tier pattern and the other platform is forming the second tier pattern. Means are provided on the bale wagon for selecting one of the platforms for actuation and for then actuating the one platform to move between its respective position upon respective movements of the tier-forming table and the bale-receiving table.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIG. 1 is a side elevational view of a bale wagon embodying the principles of the present invention, showing the bale wagon with a partially formed two and one-half bale wide stack of bales on its load bed and during the formation of one of the two alternating and interlocking tier patterns of bales on its second tier-forming table;

FIG. 2 is a perspective view of the stack on a smaller scale than that of FIG. 1, showing the stack after it has been rotated 90° and placed upright on the ground or the like by the bale wagon of FIG. 1;

FIG. 5 is a partial front elevational view of FIG. 4;

FIG. 7 is a side elevational view of FIG. 6;

FIG. 8 is an enlarged fragmentary side elevational view of the means for selecting which one of the two pivotal platforms will be operated during the next succeeding tier-forming operation on the second table and thus determing which one of the two tier patterns will be formed thereon;

FIG. 9 is a plan view of FIG. 8 as seen at an approximately 45 degree angle to the left of vertical in FIG. 8;

FIG. 10 is an enlarged fragmentary plan view of the means generally underlying the second table which ties together the pivotal movement of the second table with the pivotal movement of the first table to control the operation of the selected one of the pivotal platforms;

FIG. 11 is a side elevational view of FIG. 10;

FIGS. 12 through 19 are schematic representations of the operation of forming bales into one of the two interlocking tier patterns on the second table of the bale wagons of FIG. 1;

FIGS. 28 and 29 are schematic representations of intermediate steps occurring between those steps illustrated in FIGS. 14 and 15, showing a pair of standard length bales being successively received by the first table;

FIGS. 32 and 33 are schematic representations of intermediate steps occurring between those steps illustrated in FIGS. 18 and 19, showing a pair of bales being successively received by the first table where one of the bales is significantly longer than the standard bale length;

FIG. 34 is a partial schematic representation of the hydraulic components of the bale wagon, showing the components for controlling the opertions of the first and second tables, the pivotal platforms and the inner trip lever of the inner trip mechanism of the first table;

FIG. 35 is a partial schematic representation of the platform selecting means of FIG. 8, showing its condition when the right pivotal platform has been selected for operation; and FIG. 36 is a partial schematic representation of the platform selecting means, similar to FIG. 35, but showing its condition when the left pivotal platform has been selected for operation.

DETAILED DESCRIPTION OF THE INVENTION

Figure 4:
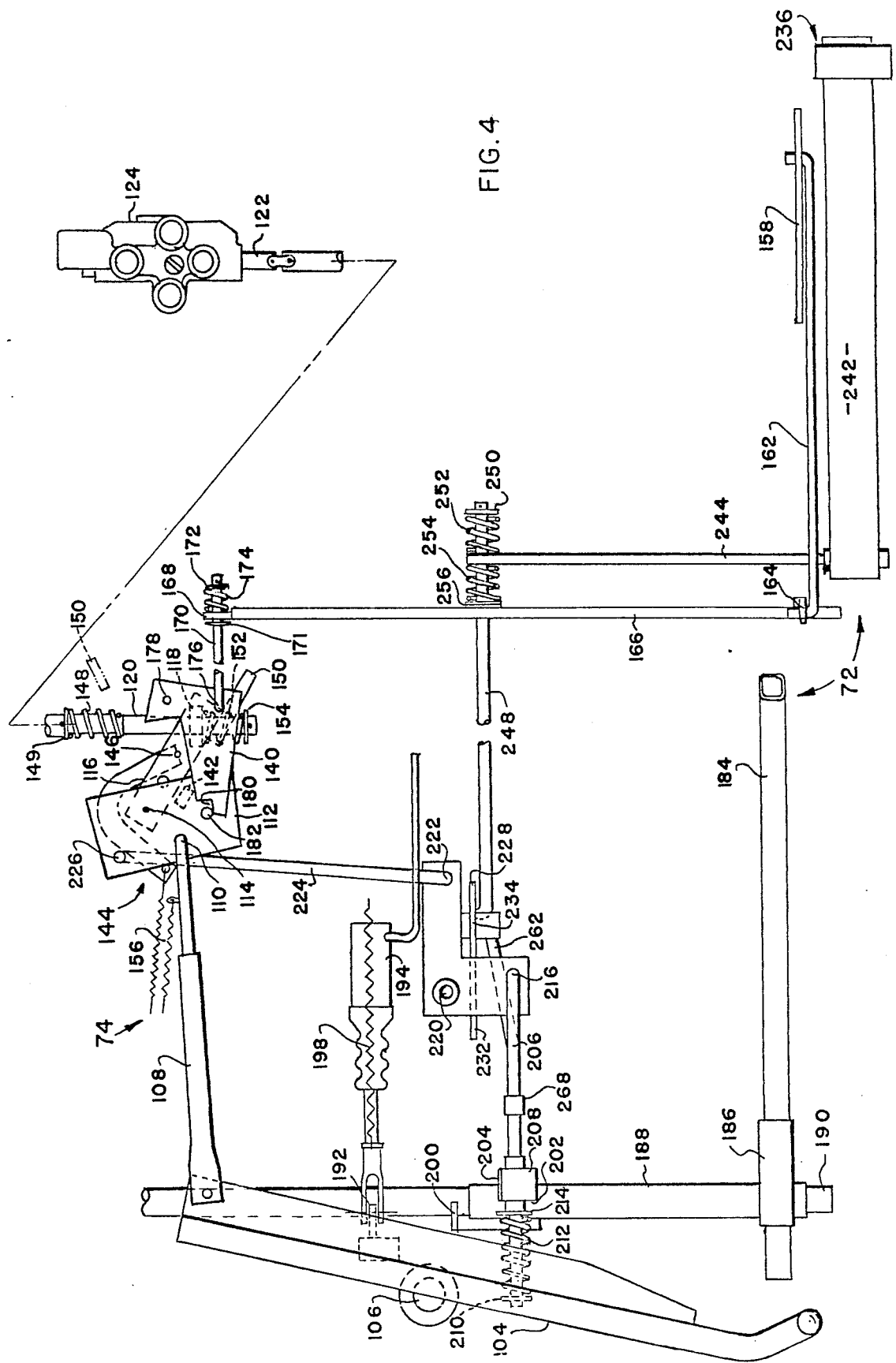
FIG. 4 is an enlarged fragmentary plan view of the outer and inner trip and bale position sensing and control mechanism generally underlying the first table and the front portion of the second table of the bale wagon.

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

IN GENERAL

Referring now to the drawings, and particularly to FIG. 1, there is shown a bale wagon, being indicated generally by the numeral 10, comprising the preferred embodiment of the present invention for forming a two and one-half bale wide stack of bales, as shown in FIG. 2.

The bale wagon 10 is provided with a chassis, indicated generally as 12, mounted on left and right pairs of tandemly-arranged wheels, only the right pair of wheels 14 being shown in FIG. 1. The chassis 12 is formed of left and right longitudinally extending channels 16 (only the right channel being shown), with the forward ends thereof converging in a clevis assembly which adapts the wagon to be secured to a tractor, or other towing vehicle, located at the front of the wagon.

Mounted at the forward end of the chassis 12 and extending transversely thereto is a first receiving table, generally indicated by the numeral 18. The receiving table 18 is comprised by two transversely extending spaced beams 20 which are mounted on a forwardly extending horizontal portion 22 of an L-shaped structure 24. The structure 24 includes a rear upwardly extending leg portion 26 which is pivotally secured at 28 between spaced-apart upstanding front brackets 30, only the right one being shown, mounted on the longitudinal channels 16. A hydraulic cylinder 32 is pivotally secured at its anchor end to a transverse frame member 34 mounted between the longitudinal channels 16. The rod end of the hydraulic cylinder 32 is pivotally secured to the free end of an arm 36 which is fixedly secured to, and extends rearwardly and upwardly from, the L-shaped structure 24 of the receiving table 18. As the hydraulic cylinder 32 is extended, the receiving table 18 will swing or pivot approximately 90° upwardly about its pivot point 28 transferring any bales B which have been accumulated on the table 18 onto a second tier-forming table, being generally indicated by the numeral 38.

It will be understood by those skilled in the art, that the bales are first introduced to the receiving table 18 by means of a pickup, not shown, which is mounted to the chassis 12 at the left end of the table 18 and operative to lift bales from the ground and direct them to the left receiving end of table 18. The pickup, well known in the art, is generally similar to the one illustrated and described in U.S. Pat. No. 2,848,127 and need not be illustrated and described herein for a thorough and clear understanding of the present invention. Also, it will be understood by those skilled in the art, that a cross conveyor 39 (FIG. 3) is operatively mounted to the chassis 12 and extends between and along the two beams 20 of the first table 18 from approximately the left end to near the middle of the beams 20 for moving the bales from the pickup means toward the right end of the first table 18. The cross conveyor means, also well known in the art, is generally similar to the one illustrated and described in the aforementioned U.S. Patent and need not be illustrated and described herein for a thorough and clear understanding of the present invention.

The second tier-forming table 38 is comprised by an L-shaped structure 40 (see also FIGS. 6 and 7) having a forwardly extending leg portion 42 across which is formed a bed 44 which provides a surface upon which bale tiers are formed and an upwardly extending rear leg portion 46 which is pivotally secured at 48 between spaced apart upstanding intermediate brackets 50, only the right one being shown, mounted on the longitudinal channels 16. A hydraulic cylinder 52 is pivotally secured at its anchor end to a second transverse frame member 54 mounted between the longitudinal channels 16. The rod end of the hydraulic cylinder 52 is pivotally secured to the free end of an arm portion 56 which is fixedly secured to, and extends rearwardly from, the L-shaped structure 40 of the second table 38. When the second table 38 is in its normal horizontal tier-forming position, as shown in FIG. 1, it rests at its forward end on a transverse support member, not shown, fixed to the front bracket 30. When the requisite number of bales have been accumulated on the second table 38, and formed thereon into one of two alternating, interlocking tier patterns in a manner to be described in detail hereinafter, the hydraulic cylinder 52 is actuated by trip means 57 now shown in FIG. 1 (see FIG. 3) so that it extends and causes the table 38 to swing or pivot upwardly generally 90° about its pivot point 48 to a generally vertical, tier-discharging position adjacent the front end of a rearwardly disposed load bed, or third load table, being generally indicated by the numeral 58. In this manner, the bale tier formed on the second table 38 is transferred to the load bed 58.

It will be understood by those skilled in the art, that the trip means 57 for actuating pivotal movement of the second table 38 is mounted to the chassis 12 and extends upwardly through a slot 60 formed in the middle of the table bed 44 at its rearward end. The structure and function of the second table trip means, well known in the art, is generally similar to that illustrated and described in U.S. Pat. No. 3,502,230 and need not be illustrated and described herein for a thorough and clear understanding of the present invention.

The load carrying bed 58 includes a platform assembly 62 which is pivotally mounted at 64 between spaced apart upstanding rear brackets 66, only the right one being shown, mounted on the longitudinal channels 16. A pair of spaced apart hydraulic cylinders 68, only the right one being shown, are pivotally secured at their anchor ends to the second transverse frame member 54 and at their rod ends to the platform assembly 62. When the load bed 58 is in its normal, generally horizontal tier-receiving position, as shown in FIG. 1, it rests at its forward end on upstanding intermediate brackets 50. A stack of bales is progressively formed on the load bed 58 upon successive delivery thereto of tiers of bales by pivotal movement of the second table 38 from its normal horizontal tier-forming position of FIG. 1 to its generally upright position adjacent the forward end of the load bed 58.

As the first bale tier is delivered or deposited onto the load bed 58, a fore-and-aft moveable rolling rack, being generally indicated by the numeral 70, is contacted by the tier and forced to move rearwardly along the load bed 58. It will be understood by those skilled in the art, that while the rolling rack 70 is spring biased to move toward the forward end of the load bed 58, the bias of the spring means is overcome with the delivery of each successive bale tier from the second table 38 to the front end of the load bed 58 whereby the rolling rack 70 is forced to move rearwardly one bale width until the rack 70 reaches a rearmost position along the load bed 58, whereupon a complete stack has been formed on the load bed 58. The structure and function of the rolling rack 70, well known in the art, is generally similar to that illustrated and described in U.S. Pat. No. 2,848,127 and need not be illustrated and described herein for a thorough and clear understanding of the present invention.

When the load bed 58 has been fully loaded, the stack can be transferred to the ground in the form of a composite stack by extension of the hydraulic cylinders 68 which cause the load bed 58 to pivot generally 90 degrees about point 64 from its generally horizontal position of FIG. 1 to an upright position in which the rolling rack 70 and the rear end of the load bed 58 are disposed adjacent the ground.

THE TWO AND ONE-HALF WIDE STACK OF BALES FORMED BY THE BALE WAGON

The bale wagon 10 of FIG. 1 incorporates various mechanical and hydraulic components, described in detail hereinafter, which cooperate together and with some of the basic, generally well known bale wagon components, just described hereinbefore, to automatically form two alternating and interlocking bale tier patterns in a manner schematically illustrated in FIGS. 12 through 27, and, thus, adapt the bale wagon 10 to form a two and one-half wide stack of bales, as shown in FIG. 2.

While bales in either of the two tier patterns may form the base of lowermost tier of the stack which contacts the ground, a first of the two interlocking tier patterns of bales, being generally designated F and forming the base tier of the stack of FIG. 2 and the rearmost upright tier of the partially-formed stack of bales on the wagon load bed 58 in FIG. 1, comprises one pair of bales disposed longitudinally end-to-end in a row, and a plurality of like pairs of bales, preferably five pairs, successively disposed in transverse relationships along one longitudinally-extending side of the one pair and generally between opposite ends of the one pair of bales. The aforementioned one pair of bales of tier pattern F will be referred to hereinafter as the right rail bales R. A second of the two interlocking tier patterns of bales, being generally designated S and forming the next lowest tier of the stack of FIG. 2 and the next rearmost upright tier of the partially-formed stack of bales on the wagon load bed 58 in FIG. 1, comprises a second pair of bales disposed longitudinally end-to-end in a row, like the right rail bales R, but being aligned along the outer ends of the transversely-disposed like pairs of bales in tier pattern F at a location remote from the right rail bales R, and another plurality of like pairs of bales, also preferably five pairs, successively disposed in transverse relationships along the other longitudinally-extending side of the second pair of bales, being located opposite to the one longitudinal side of the right rail bales R, and generally between opposite ends of the second pair of bales. The aforementioned second pair of bales of tier pattern S will be referred to hereinafter as left rail bales L. It will be noted that the outer ends of the transversely-disposed like pairs of bales in tier pattern S are aligned along the upper longitudinal surface of the right rail bales R generally between opposite ends thereof. Further, it is readily apparent from FIG. 2 that the two interlocking tier patterns F, S would be identical bale arrangements if one pattern was rotated 180° about a central longitudinal axis.

Thus, the tier patterns F, S comprise the basic building blocks or units of the stack, being disposed in alternating fashion one on top of the other upwardly from the ground to the top of the stack. It should be pointed out that the left rail bales L, shown in dashed outline form in FIG. 2, of the uppermost tier, which is the last tier formed by the bale wagon 10, may be omitted during the last tier-forming operation on the wagon second table 38, which will be described in detail hereinafter, in veiw of the tendency of bales formed of certain crop materials to fall off the stack during pivotal unloading of the stack by operation of the wagon load bed 58 as described hereinbefore. However, the alternately-positioned right and left rails R, L of tiers F, S positioned successively below the uppermost tier are effectively locked in place in the stack by the respective outer ends of the transversely-disposed pairs of bales in the tiers F, S being engageably superimposed thereon. Further, it is readily seen that each bale in the stack above the lowermost tier engageably overlaps at least two lower bales and each bale in the stack, above the lowermost tier, being exposed at either the right or left side of the stack engageably overlaps at least one lower bale which extends in a generally transverse relationship to it. Still further, the outer end of the middle transversely-disposed pair of bales, there being one such pair in each of the tiers F, S, above the lowermost tier, engageably overlaps both of the bales forming one of the rails R, L which extend transversely to the middle pair. The enhanced stability of the stack which results from the above-described overlapping relationship between the bales of adjacent tiers is readily apparent. In this regard, it should be brought out that the detrimental effects on stack stability which normally result from frequently encountered bale length variations, without some compensatory provision being made therefor during formation of the stack, could be a significant problem in the case of the two and one-half wide stack. In particular, the incorporation of short bales into the transversely-disposed pairs of bales would appear to result in the withdrawal of underlying support for the adjacent, overlying rail bales and, thus, outward toppling of at least the affected rail bales, if not also the adjacently positioned portion of the bale stack, since in the formation of such pairs in the first tier pattern F of the two and one-half wide stack by utilizing an inner or intermediate trip mechanism, as it is generally known heretofore in the art, for controlling the actuation of the first table, all of the undesired length variation would appear along the outer left longitudinal side of the stack. However, such problem is substantially obviated in the bale wagon 10 of the present invention by one of the aforementioned mechanical components incorporated in the wagon 10. Such component is a mechanism, generally indicated by numeral 72 in FIGS. 4 and 5, for tripping the first table and sensing and controlling the position of the two bales which are intended to form one of such transversely-extending pairs in the first tier pattern F, during their delivery along the first table 18. The mechanism 72 is incorporated specifically into a first table outer trip mechanism, generally designated by numeral 74 which mechanism 74 generally is similar to that illustrated and described in U.S. Pat. No. 3,330,424. Both of the mechanisms 72, 74 will be described in detail hereinafter.

PIVOTAL RAIL-FORMING PLATFORMS ON THE SECOND TABLE

Figure 6:
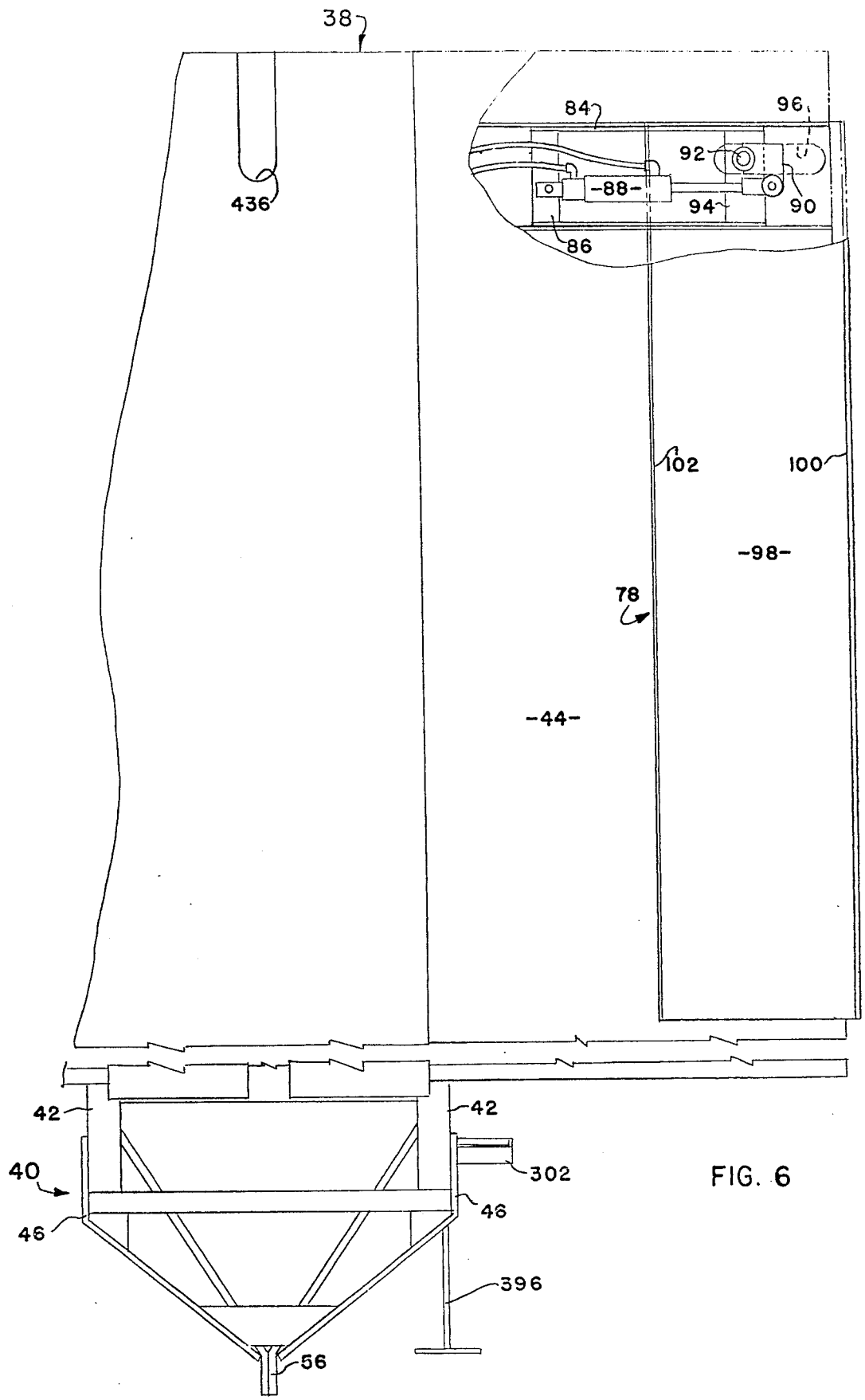
FIG. 6 is an enlarged fragmentary plan view of the second table of the bale wagon, showing the right pivotal platform on the second table and the mechanism for pivoting the platform to form the right longitudinally-arranged, end-to-end side pair of bales in the one of the two tier patterns.
Figure 23:
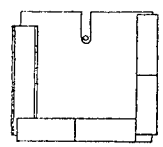
FIGS. 20 through 27 are schematic representations of the operation of forming bales into the other of the two interlocking tier patterns on the second table of the bale wagon of FIG. 1.
Figure 3:
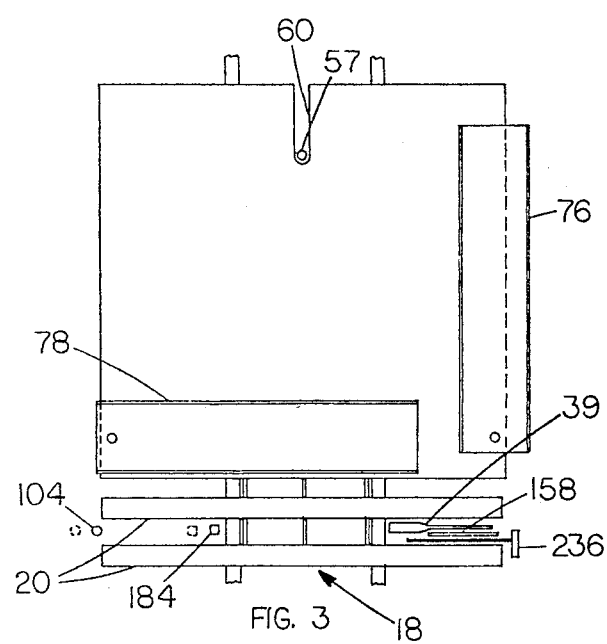
FIG. 3 is a plan view of the first and second tables of the bale wagon of FIG. 1, showing the right and left pivotal platforms on the second table for respectively positioning the pairs of longitudinally-arranged, end-to-end side bales of the two tier patterns and the locations along the first table of the first table outer trip mechanism and the first table inner trip and bale position sensing and control mechanism.

The second table 38 of the bale wagon 10, as shown in FIG. 3 and in more detail in FIGS. 6 and 7, incorporates another one of the aforementioned mechanical components, that being a apir of pivotal left and right rail-forming platforms 76, 78 pivotally mounted on the second table 38 adjacent respective forward end corners thereof at 80 and 82, only the right platform being shown in FIGS. 6 and 7.

A rectangular frame 84 is mounted transversely along the forward end of the second table 38 on the underside thereof and adjacent each corner thereof. Only the structure of the frame 84 and the various structural elements associated therewith and with the right platform 78 will be described, it being understood that an identical frame and identical structures associated therewith are also associated with the left platform 76. The frame 84 includes a cross brace 86 pivotally anchoring one end of a right hydraulic cylinder 88 (a left hydraulic cylinder 89 being schematically shown in FIG. 34) having its rod end pivotally secured to a free end of a right-angled link arm 90 being, in turn, fixed to a shaft element 92 fixed to the platform 78 and rotatably mounted about a vertical pivot axis at 82 in an upstanding sleeve being fixedly carried by another cross brace 94 of the frame 84. An elongated slot 96 is transversely formed through the second table 38 for allowing passage of the shaft element 92 and lateral movement thereof along the slot 96 such that, through transverse adjustment of the frame 84, the platform 78 and its respective hydraulic cylinder may be moved as a unit to different desired positions in setting up the second table 38 to accomodate bales having different standard sizes, if such adjustment is deemed to be desirable.

When the hydraulic cylinder 88 is actuated to its extended position, as shown in FIG. 6, the right platform 78 is pivotally moved 90 degrees from its forward bale-receiving position of FIG. 3 to its side, rail-forming position of FIG. 6. Retraction of the cylinder 88 brings the platform back to its forward position of FIG. 3. The platform 78 is formed by a narrow elongated, generally planar bed portion 98 having an overall length nearly approximating the combined lengths of two average bales and somewhat shorter than the length or width of the second table 38. The width of the bed portion 98 also approximates the width of an average bale. The platform 78 has two spaced apart, rotatably mounted rollers 99 for carrying the platform 78 in its movement across the second table bed 44. The platform 78 further has opposing lips 100, 102 running respectively along opposite longitudinal edges of the platform 78. The outer or rearward lip 100, which ever it is depending on where the platform 78 is positioned, has a greater height than the forward or inner lip 102 for preventing the bales being delivered thereto by the first table 18, when the platform 78 is in its forward position, from sliding rearwardly past the platform 78 and also for maintaining the rail bales R in its desired position. The two lips 100, 102 when considered together, in a manner of speaking, provide sideboards for maintaining the rail upon the platform bed portion 98. When the platform 78 is in the side position shown in FIGS. 1 and 6, it should be noted that the lips 100, 102 generally extend parallel to the direction of movement of the transversely-disposed pairs of bales during positioning and moving of the pairs rearwardly along the second table bed 44 whereby the tier-forming operation is not hindered by the presence of the right platform 78 when it is not, strictly speaking, in use. However, the lips 100, 102 do generally contribute to the maintaining of the original positional relationship of the transverse bale pairs, as established when they are first placed on the second table 38, with reference to the right side of the second table 38 and the facing longitudinal side of the left rail bales L. Although, the above-cited advantages were explained with reference to right platform 78, they have equal application in the case of left platform 76.

FIRST TABLE OUTER TRIP MECHANISM

In order to systematically perform the steps involved in the formation of each of the interlocking tier patterns F, S by the bale wagon 10, a pair of bales must be delivered to the first table 18 and disposed therealong, preferably on their "flat" (wire or twine bearing) sides as shown in FIG. 1, at one of two predetermined positions, depending upon which particular step of the tier-forming operation is to be subsequently carried out, before the first table 18 is actuated so as to pivotally cycle and deposit the pair of bales, preferably on their "edge" (non-wire or twine bearing) sides as shown in FIG. 1, on the front edge portion of the second table 38 at a position therealong corresponding to the one of the two predetermined first table positions. The mechanical components being incorporated into the bale wagon 10 for insuring that the pair of bales will be disposed at a selected one of the two predetermined positions are the first table outer trip mechanism 74 and the first table inner trip and bale position sensing and control mechanism 72.

The first table outer trip mechanism 74, being shown in detail in FIGS. 4 and 5, includes an outer trip lever 104, shown also schematically in FIG. 3 but not shown in FIG. 5, being pivotally mounted about a vertical axis at 106 to a transverse frame member (not shown) which extends laterally outwardly from the right longitudinal channel 16. The lever 104 is pivotally coupled at one end to an adjustable rod 108 which is, in turn, pivotally secured at 110 to an actuating plate 112 being pivotally secured at 114 about a vertical axis to a bracket (not shown) fixed to the outer side of the right channel 16. Also mounted at 114 below the plate 112 for pivotal movement independently of the plate 112 is a link 116 which is also slideably coupled at 118 along one end of a rod 120 which is pivotally secured to the outer end of a spool 122 of a first table hydraulic control valve 124 for controlling the operation of the first table hydraulic cylinder 32.

As shown in FIGS. 4 and 34, the spool 122 is in its "out" position. In such position, the flow of hydraulic fluid in pressure supply line 126 from suitable lines, not shown, connected to a pump 128 via a bale pickup orbit motor, not shown, will not be connected to flow through the right end of the first table control valve 124 into line 130 and from there to line 132 for supplying hydraulic fluid to the cylinder 32 in order to extend the cylinder 32 and thus pivotally cycle the first table 18. Instead, with the control valve spool 122 in its "out" position, the hydraulic fluid from pressure line 126 is connected to flow through the left end of the first table control valve 124 into line 134 which intersects with pressure supply line 136, communicating with the pump 128 via flow divider 138, whereby fluid being supplied along line 136 combines with that flowing in line 134 and flows in the direction indicated by the arrow along line 134 to other hydraulic components. Thus, when control valve spool 122 is in its "out" position, the first table hydraulic cylinder 32 is maintained inoperative at its contracted position and the first table 18 is disposed in its generally horizontal bale-receiving position of FIG. 1. When the control valve spool 122 is moved to its "in" position, which connects the flow of hydraulic fluid from pressure supply line 126 through the left side of valve 124 to line 130 and from there along line 132 to cylinder 32, the cylinder 32 is extended and the first table 18 is pivoted to its upright bale discharge position adjacent the fron end of the second table 38. The first table 18 will be held at such position so long as the spool 122 is maintained at its "in" position.

For moving the control valve spool 122 from its "out" position to its "in" position, the outer trip lever 104 must be pivotally moved slightly clockwise about point 106, as viewed in FIG. 4, which moves adjustable rod 108 toward plate 112 which causes pivoting of plate 112, if it is not prevented from doing so by a lock latch 140 the purpose for which will be described hereinafter, in a counterclockwise manner about point 114. As the plate 112 so moves, a small block 142, being fixed to the underside of the plate 112 and protruding downwardly therefrom across the plane within which the link 116 is capable of being pivoted, will engage the line 116 and carry it along with the plate 112, the link 116 also pivoting counterclockwise about point 114, until the link 116 reaches the effective centerline of an over-center device 144 pivotally coupled to the link 116 at 146. Upon passing the aforesaid centerline, the link 116 is further pivotally moved at an accelerated pace by device 144, independent of the movement of plate 112, and compresses a spring 148 encircling rod 120 against a washer 149 fixed thereto to move the rod 120 toward the control valve 124 which moves the spool 122 from its "out" to its "in" position. Also, the over-center device 144 maintains the link 116 in compressive engagement against the spring 148 to maintain the rod 120 displaced toward the control valve 124 and the spool 122 at its "in" position.

As stated hereinbefore, the first table 18 will be held at its upright, bale-discharge position so long as the spool 122 is maintained at its "in" position. However, it is desired to return the spool 122 to its "out" position approximately simultaneously as the first table 18 reaches its upright position so that the table 18 will only be momentarily disposed at such position. In order to accomplish the return of the spool 122, a pivotal trip arm (not shown) is mounted to the right upstanding front bracket 30 and has an upper end which extends across the path of pivotal movement of the forwardly extending horizontal portion 22 of the L-shaped structure 24 of the first table 18 near the upper end of the path and a lower end which, during pivotal movement of the trip arm and upon engagement of its upper portion by the first table 18, moves through a path which crosses the dashed outline position of a protruding member 150 fixed to the outer end of link 116, as shown in FIG. 4, and contacts the member 150 to pivotally move the link 116 back across the aforesaid centerline whereupon the over-center device 144 acts to pivotally return the link 116 at an accelerated pace to its initial position, independent of the movement of the trip arm, and compresses a spring 152 also encircling rod 120 against another washer 154 fixed at the end of the rod 120 to move the rod 120 away from the control valve 124 which moves the spool 122 from its "in" to its "out" position. Also, the over-center device 144 maintains the link 116 in compressive engagement against the spring 152 to maintain the rod 120 displaced from the control valve 124 and the spool 122 at its "out" position. It should be noted that a spring 156 is coupled to the adjustable rod 108 which will automatically return the rod 108, the plate 112 and the lever 104 to their initial positions of FIG. 4 as soon as the forward end of the pair of bales on the first table 18 are moved out of engagement with the outer end of lever 104 upon pivot movement of the first table 18 from its horizontal position. Thus, the actuation plate 112 is returned to its initial position prior to the return of link 116.

The first table outer trip mechanism 74 further includes an L-shaped trip lock lever 158, also shown schematically in FIG. 3, being pivotally mounted about a horizontal axis at 160 to another transverse frame member (not shown) which extends laterally outwardly from the left longitudinal channel 16. The lock lever 158 extends at its upper end between first table beams 20 and is pivotally coupled at its lower end near pivot point 160 to a rod 162 which extends toward the left channel 16 and is pivotally secured to the upper end of a crank arm 164 being fixed on one end of a longitudinal connecting rod 166. The connecting rod 166 extends along left channel 16 and is pivotally mounted thereto near its opposite ends by tabs (not shown) fixed to the outer side of the left channel 16. An upstanding member 168 is fixed to the opposite end of the connecting rod 166 and has an opening formed through its upper end for slidably receiving one end portion of a link rod 170 have a washer 171 fixed thereto adjacent one side of member 168 and another washer 172 fixed to its outer end with a spring 174 encompassing the rod 170 between the washer 172 and an opposite side of member 168. The other end of the link rod 170 is pivotally coupled to lock latch 140 at 176, which latch 140 is pivotally mounted about a vertical axis at 178 to the bracket (not shown) on which the actuating plate 112 is mounted.

A spring 179 fixed to the transverse frame member (not shown) normally maintains the upper end of trip lock lever 158 extending above the first table beams 20 and thereby maintains the lock latch 140 in a normal locking position, as shown in FIG. 4. In its normal locking position, the lock latch 140 has a notch 180 formed therein which is aligned with a pin 182 fixed to and extending above the surface of actuating plate 112 so that until the lock latch 140 is pivotally moved counterclockwise about pivot 178, the plate 112 will be prevented from being pivotally moved counterclockwise.

Although counterclockwise pivotal movement of the L-shaped lever 158 downwardly about point 160 by a bale received on the first table 18 causes movement of rod 162 toward the lever 158 which causes clockwise rotation of connecting rod 166 which compresses upstanding member 168 against spring 174 and causes link rod 170 to move in a direction away from lock latch 140 and pivotally move the latch 140 counterclockwise to unlock the actuating plate 112, the actuating plate 112 will not pivot counterclockwise unless simultaneously a bale engages the trip lever 104 and moves it clockwise about point 106. Such simultaneous condition is not possible until two bales have been received on the first table 18 since the trip lever 104 and the lock latch 140 are displaced from each other substantially more than the length of a single bale, but less than the length of two bales.

Furthermore, the trip lever 104 is positioned in general alignment with the right side of the second table 38 and the right end of the first table 18 so that the two bales when viewed together on the first table 18 are disposed in one of the two abovementioned predetermined positions along the first table 18 in offsetting relationship to the right of the longitudinal centerline of the second table 38 and will be deposited either on the right platform 78 when in its forward position at the beginning of the formation of tier F, as shown in FIG. 4, or on the second table 38 with the right end of the pair of bales overlying the front end of the right platform 78 when in its side position of FIG. 6 during the formation of tier S. It will also be noted that the two bales when viewed together in this right offsetting relationship are displaced at the left end thereof approximately one bale width from the left side of the second table 38.

FIRST TABLE INNER TRIP AND BALE POSITION SENSING AND CONTROL MECHANISM

In order to provide a pair of bales along the first table 18 in the other of the two abovementioned predetermined positions in which the bales, when viewed together as a unit, will be disposed in offsetting relationship to the left of the longitudinal centerline of the second table 38, a first table inner trip and bale position sensing and control mechanism 72 is provided which utilizes the actuating plate 112, trip lock lever 158 and lock latch 140 of the first table outer trip mechanism 74 in actuating the operation of the first table 18 when the bales are located at the other predetermined position.

The mechanism 72 includes an inner, arcuate-shaped trip lever 184, also shown schematically in FIG. 3, being adjustably mounted by clamp 186 in transverse relationship to a sleeve 188 which is rotatably fitted on a shaft 190 being rotatably mounted at its one end adjacent the clamp 186 on a transverse frame member (not shown) which extends laterally outwardly from the right longitudinal channel 16 and near its opposite end on the same transverse frame member (not shown) which also pivotally mounts the outer trip lever 104 of the first table outer trip mechanism 74. A crank arm 192 is fixed transversely to the opposite end of shaft 190 and pivotally coupled to the rod end of a hydraulic trip slave cylinder 194 which is pivotally anchored to the same transverse frame member last-mentioned above. The trip slave cylinder 194 is shown in FIG. 4 in its extended position, while in FIG. 34 in its retracted position. Referring to FIG. 34, it is seen that the trip slave cylinder 194 is moved to its extended position, and the arcuate-shaped trip lever 184 is caused thereby to pivot to its operative position in which it extends between and upwardly above the beams 20 of the first table 18 as shown in FIG. 5, each time the right platform hydraulic cylinder 88 is actuated to its extended position, as shown in FIG. 6, and the right platform 78 is thus pivotally moved from its forward to its side position. Further, the trip slave cylinder 194 remains in its extended position, and the inner trip lever 184 is maintained thereby in its raised operative position, so long as the right platform hydraulic cylinder 88 remains in its extended position to maintain the right platform in its side position. Once the right platform hydraulic cylinder 88 is returned to its retracted position shown schematically in FIG. 34, hydraulic fluid ceases to be maintained under pressure along line 196, as will be explained in further detail hereinafter, and within the slave cylinder 194 such that an extended spring 198, being coupled between the rod end of the cylinder 194 and the aforementioned latter transverse frame member near the anchor end of the cylinder 194, returns the slave cylinder 194 to its retracted position, causing the inner trip lever 184 to lower to its inoperative position below the first table beams 20.

In order for extension of the slave cylinder 194 to pivotally raise the inner trip lever 184, a tab 200 being fixed to, and extending radially outwardly from, the shaft 190 engages a side 202 of a vertical bracket 204 fixed to sleeve 188, when the tab 200 rotates counterclockwise with the shaft 190 due to extension of slave cylinder 194, and carries the bracket 204 and thus the sleeve 188 and inner trip lever 184 in counterclockwise rotation with the shaft 190.

The bracket 204 extends both generally upwardly and downwardly along the sleeve 188. A link rod 206 is slideably received through a tubular element 208 pivotally mounted to the upper end of the vertical bracket 204 and has a washer 210 fixed to its outer end with a spring 212 encompassing the rod 206 between the washer 210 and another washer 214 disposed adjacent one end of the tubular element 208. The opposite end of the link rod 206 is pivotally secured at 216 to one corner of a right-angled plate 218 being pivotally mounted about a vertical axis at 220 to the same aforementioned transverse frame member (not shown) that pivotal mounts the outer trip lever 104 of the first table outer trip mechanism 74. An opposite corner of the plate 218 is pivotally secured at 222 to one end of a connecting link 224 which is pivotally secured at its other end at 226 to the actuation plate 112.

An auxilliary lock latch 228 is pivotally mounted at 230 to the same aforementioned transverse frame member (not shown) that pivotally mounts the right-angled plate 218 and includes a transverse upper latching portion 232 and a depending lower linking portion 234.

The mechanism 72 further includes a bale position sensing arm 236 which is interconnected to the auxilliary lock latch 228 for moving the latch 228 between a locking position and its unlocking position shown in FIG. 5. The arm 236, shown schematically in FIG. 3, includes an upstanding bale sensor 238 having a short lower transverse section 240, and a long transverse tubular member 242 having the short transverse section 240 of the sensor 238 telescopically received and adjustably secured on its outer end. The member 242 extends toward the left channel 16 (not shown) and is secured on one end of a connecting rod 244. The connecting rod 244 extends along the left channel 16 and is rotatably mounted through the same transverse frame member (not shown) that pivotally mounts the trip lock lever 158 of the first table outer trip mechanism 74. A depending member 246 is fixed to the opposite end of the connecting rod 244 and has an opening formed through its lower end for slideably receiving one end portion of a link rod 248 having a washer 250 fixed to its outer end with a spring 252 being disposed about the one end portion of the rod 248 between the washer 250 the lower end of depending member 246. Another spring 254 is disposed about the one end portion of the rod 248 on an opposite side of the lower end of depending member 246 between the lower end thereof and another washer 256 being spaced a short distance therefrom and fixed to the link rod 248. The other end of the link rod 248 is pivotally coupled to the depending linking portion 234 of the auxilliary lock latch 228 at 258.

As was stated earlier in this application, the incorporation of short bales into the pairs of transversely-disposed pairs of bales forming the first tier pattern F could be a significant problem in the case of a two and one-half wide stack if a first table inner trip mechanism was utilized which functioned generally the same as the first table outer trip mechanism 74, that is, it only would sense the position of the pair of bales along the first table 18 at the right end thereof. As pointed out hereinbefore, such bale position sensing method when applied to the transversely-disposed pairs of bales of the first tier pattern F would result in the formation of a void or gap between the left end of the pair and the left side of the second table 38 at which location the detrimental effect of a gap or void on stack stability is readily understood. However, the bale position sensing and control mechanism 72 incorporated into the bale wagon 10 senses and controls the position of a pair of bales with respect to two reference point, instead of just one, such points capable of being accurately established respectively at both right and left ends of the pair of bales by the mechanism 72.

The right reference point is established by adjusting the inner trip lever 184 with respect to its pivotal axis so that when the lever 184 is pivoted upwardly upon being contacted by the leading bale of the pair being moved along the first table 18 by the cross conveyor, it would actuate pivotal movement of the first table 18, in the absence of lock latch 140 and auxiliary lock latch 228, when the leading bale has reached a position spaced a short distance from the left side of the right rail bales R, for example, four inches. In effect, by so adjusting the inner trip lever 184, the capability of creating a gap or void between the right end of the bale pair and the left side of the right rail bales R is stored in the inner trip lever 184, since the left reference point is most desirably established, through adjustment of the position of the upstanding bale sensor 238 along the tubular member 242, at a location being displaced from the left side of the right rail bales R through a distance approximately equal to two times the average or standard length of the bales being stacked. Such location generally falls in alignment with the outside longitudinal edge of the left platform 76 when in its side position.

Figure 17:
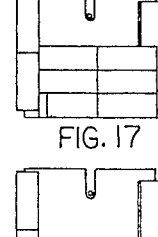
Figure 31:
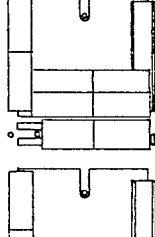
Figure 15:
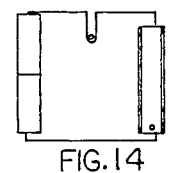
Figure 29:
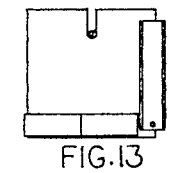

Therefore, given the above two reference points, if the bales in the pair delivered across the first table 18 are both equal to the average or standard length, such being represented schematically in FIGS. 28 and 29, the inner trip lever 184, although being preset for a four inch gap, will not trip the first table 18 until the left end of the pair passes by the bale sensor 238 at which moment a spring 260 fixed between the tubular member 242 and the transverse frame member (not shown) pivots the arm 236 upwardly to its normal position of FIG. 5. When the arm 236 is in such position and the trip lever 158 being depressed, both lock latches 140 and 228 are in their unlocked position and actuation of the first table 18 occurs. Thus, since such pair of two average-length bales upon actuation of the first table 18 are positioned at their left end toward the right end of the first table just pass the bale sensor 238, the left end of the bales will fall on the desired alignment for that side of the tier F and the right end will be substantially flush against the left side of rail bales R, as seen in FIG. 15. If the overall length of the pair of bales was short four inches as seen in FIG. 31, it is readily apparent that a four inch gap would be created adjacent the left side of the rail bales R, but that the left end of the pair would fall on the desired alignment with the left reference point, as seen in FIG. 17.

Figure 33:
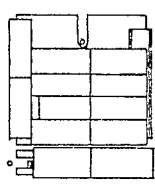

Suppose a long bale is encountered, such as shown in FIG. 33, it will be noted that, on the basis of the above-described adjustments of the inner trip lever 184 and the bale sensor 238 of the bale position sensing arm 236, the arm 236 will not be allowed to pivot upwardly to its normal unlocking position for actuating the first table 18 since the left end of the pair will come to rest on the bale sensor 238. As seen in FIGS. 4 and 5, an override device, generally designated 261, is incorporated in the mechanism 72 to compensate for this contingency. The device 261 includes a connecting rod 262 being slideably received at one end through a tubular element 264 pivotally mounted to the lower end of the vertical bracket 204 and pivotally coupled at its other end at 266 to the lower end of the depending lower linking portion 234 of the auxilliary lock latch 228. Further, an adjustable stop 268 is secured along the rod 262 a small predetermined distance from the tubular element 264 which distance is preset so that, just slightly after the inner trip lever 184 has moved through its normal displacement, the element 264 will engage the stop 268 and then move the rod 262 to unlock the auxilliary lock latch 228 to actuate the first table 18 even though the arm 236 remains in its locking position. Thus, the override device 261 insures that the auxilliary lock latch 228 is unlocked when ever the preselected gap stored on inner trip lever 184 has been used up.

MEANS FOR ALTERNATELY SELECTING THE INTERLOCKING TIER PATTERNS

The mechanical and hydraulic components incorporated into the bale wagon 10, which comprise the means for selecting the interlocking tier patterns F, S in an alternating fashion, being generally designated by numeral 270, are illustrated in FIGS. 8 and 9, and schematically depicted in FIGS. 34, 35 and 36.

Referring to FIGS. 8 and 9, the selecting means 270 includes a rachet and cam mechanism, generally indicated at 272, mounted along a brace 274 which extends at an approximately 45° angle to, and interconnects, the upper end of right intermediate bracket 50 and the right longitudinal channel 16. The mechanism 272 includes a circular rachet 276 having four notches 278 formed at 90° intervals about its periphery and a circular cam 280 having a pair of arcuate recesses 282 formed at 180° intervals about its periphery. The rachet 276 and cam 280 are fixed at axially spaced apart locations along the same sleeve 284 which is, in turn, rotatably received on a shaft 286 fixed at its opposite ends respectively to the brace 274 and to one end of a right-angled bracket 288 which is also fixed at its opposite end to the brace 274.

The selecting means 270 further includes means, being generally indicated at 290, for sensing the motion of the second table 38 during approximately the final 45° of its approximately 90° movement from its horizontal, tier-forming position to its upright, tier-discharge position and for transmitting that motion to the rachet 276. The reason for sensing only the final 45° of the second table pivotal movement toward the load bed 58 will be explained hereinafter in connection with the description of other hydraulic components incorporated into the bale wagon 10. The motion sensing and transmitting means 290 includes a link 292 which is rotatably mounted to the shaft 286 at a location adjacent to the racket 276 and extends in opposite directions radially outwardly from the shaft 286 along one side of the rachet 276 to opposite end portions.

A small block element 294 is pivotally coupled at 296 to a lower one of the link opposite end portions and has a central bore defined therein through which is slideably received a connecting rod 298. The rod 298 extends generally forwardly therefrom to one end which is secured to a bracket 300 which, in turn, is secured to a U-shaped support member 302 (also shown in FIGS. 6 and 7) fixed to, and laterally extending outwardly from the right side of, the upwardly extending rear leg portion 46 of the second table 38. The rod 298 also extends generally rearwardly from the block element 294 to a free end having a washer 304 secured thereto.

The free end of rod 298 is initially provided at a given predetermined displacement from the block element 294 sufficient to allow the second table 38 to pivotally move upwardly approximately 45° and slideably pull the rod 298 through the block element 294 before the washer 304 on the rod free end is brought into engagement with the block element 294.

When the washer 304 engages the block element 294, the element 294 is carried forwardly with the rod 298, as the second table 38 traverses the final 45° of its upward pivoting cycle, to cause the link 292 to pivot counterclockwise about shaft 286 through at least a 90° arc of displacement. When the second table 38 pivotally moves back toward its lower, horizontal position, the rod 298 may slideably move through the block element 294 until another washer 306 fixed at a predetermined position along the rod 298 engages the opposite side of the block element 294. Then the block element 294 is carried back to its original position and the link 292 is rotated clockwise back to its original position of FIG. 8.

A finger member 308 is pivotally mounted to a pin 310 protruding transversely from the upper one of the link opposite end portions in overlying relation to the periphery of the rachet 276 and biased for counter-clockwise rotation, as viewed in FIG. 8, by a spring 312 toward the periphery of the rachet 276. A lower tip 314 of the finger member 308 is received in one of the periphery notches 278 of the rachet 276. Therefore, counterclockwise rotation of the link 292 causes corresponding rotation of the rachet 276. Such rotation of the rachet 276 with the link 292 continues until the outer tip 316 of the finger member 308 engages a stationary stop 318 mounted to a bracket 320 being fixed to brace 274 and disposed also in overlying relation to the rachet periphery and in the rotational path of the outer finger member tip 316. Engagement with the outer tip 316 by stop 318 causes clockwise rotation of finger member 308 and removal of the lower tip 314 from engagement with the notch 278 of the rachet 276 as the rachet 276 reaches a location displaced counterclockwise 90° from its original location.

Further, the cam 280 being fixed to the same sleeve 284 as the rachet 276 will also rotate counterclockwise 90° with the rachet 276. A two-position platform selector valve 322 is mounted on brace 274 and has the outer end of its spool 324 linked to one end of a rod member 326 having a roller 327 rotatably mounted by a U-shaped bracket 328 fixed to the other opposite end of the member 326. The rod member 326 is slideably mounted near its one end through a bracket 330 fixed to the brace 274. The U-shaped bracket 328 at the opposite rod member end is pivotally mounted to the outer end of a link arm 332 being pivotally mounted at 334 to bracket 320 which supports generally the bracket 328 such that the roller is aligned in a radial line with the rotational axis of the cam 280. A spring 336 is disposed about rod member 326 between the bracket 330 and the U-shaped bracket 328 so as to bias the roller end of the rod member 326 toward the cam 280 and the spool 324 of the selector valve 322 toward its "out" position as shown in FIGS. 8 and 9, and also schematically in FIGS. 34 and 35.

When the spool 324 is in its "out" position the roller 327 is aligned and received within the recess 282 of the cam 280, as shown in FIGS. 8 and 35. When the cam 280 is rotated 90° counterclockwise with rachet 276, the rod member 326 and its roller 327 are forced to move toward the selector valve 322 against the bias of spring 336 with the roller 327 rolling out of the recess 282 of the cam 280 onto the outermost part of the periphery thereof and to a position where the roller 327 now engages the cam periphery 90° from either of its recesses 282. Movement of the rod member 326 toward the selector valve 322 moves the spool 324 to its "in" position, as shown in FIG. 36.

Referring now to FIG. 34, it is seen that when the spool 324 is in its "out" position, also seen in FIG. 35, hydraulic lines 338, 340 are connected through the selector valve 322 to hydraulic lines 342, 344 which lead to the right platform hydraulic cylinder 88. Thus, upon actuation of other mechanical and hydraulic components to be explained hereinafter, hydraulic fluid will flow from the pump 128 to one of the opposite ends of the right platform hydraulic cylinder 88 and will flow from the other of the opposite ends of the cylinder 88 back to the tank 345.

Further, it is seen that when the spool 324 is in its "in" position, as seen in FIG. 36 hydraulic lines 338, 340 are connected through the selector valve 322 to hydraulic lines 346,348 which lead to the left platform hydraulic cylinder 89. Thus, upon actuation of these same other mechanical and hydraulic components, just referred to above and which will be explained hereinafter, hydraulic fluid will flow from the pump 128 to one of the opposite ends of the left platform hydraulic cylinder 89 and will flow from the other of the opposite ends of the cylinder 89 back to the tank 345.

MEANS FOR CONTROLLING THE OPERATION OF THE SELECTED ONE OF THE PIVOTAL PLATFORMS

The operation of the selected one of the two pivotal platforms 76, 78 in the formation of the corresponding one of the two alternating and interlocking tier patterns F, S is controlled by means, generally indicated by numeral 350 and illustrated in FIGS. 10 and 11, which is responsive to the pivotal movement of the second table 38 from its upright tier-discharging position to its horizontal tier-forming position and also responsive to pivotal movement of the first table 18 from its upright bale-discharging position to its horizontal bale-receiving position.

The control means 350 includes a platform control valve 352 being mounted generally midway along the right longitudinal channel 16 under the second table 38 to an upstanding bracket 353 fixed to channel 16. Referring to FIG. 34, the spool 354 of valve 352 is schematically represented in a "neutral" position in which the flow of hydraulic fluid in pressure supply line 356 from the pump 128 via flow divider 138 is connected to the return line 358 which connects to the tank 345. Therefore, hydraulic fluid flow is blocked to lines 338,340 which are respectively connected either to lines 344,342 leading respectively to opposite ends of right platform cylinder 88 or to lines 346,348 leading respectively to opposite ends of left platform cylinder 89, depending upon whether the spool 324 of selector valve 322 is in its "out" or "in" position. With further reference to FIG. 34, it is seen that the right platform 78 has been selected by valve 322 and that the right platform hydraulic cylinder 88 has been retracted to pivot the right platform 78 to its forward position, as shown in FIGS. 3 and 12.

Figure 27:
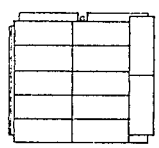
Figure 19:
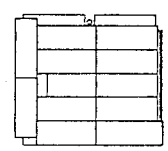

Preceding the performance of the above steps, the second table 38 was in its horizontal tier-forming position with both platforms 76,78 in their respective side positions and a completed one of the interlocking tier S having been formed thereon, as shown in FIG. 27, by the delivery of a final transverse pair of bales to the front end of the second table 38 upon pivotal cycling of the first table 18. Upon receipt of the final transverse pair of bales on the second table 38, the successive pairs of transverse bales already disposed thereon were pushed toward the rear end of the second table 38 such that the rearmost pair of transverse bales engaged the second table trip lever 57 which moved the spool 360 of the second table valve 362 to and "out" position through suitable linkage generally similar to that of aforementioned U.S. Pat. No. 3,502,230 and thereby connected pressure supply line 134 to line 364 through a pilot operated check or lockout valve 366 which allowed flow of hydraulic fluid to second table hydraulic cylinder 52 to cause extension thereof and pivotal movement of the second table 38 from its horizontal position to its upright position. As explained hereinbefore, the final 45° of such pivotal movement of the second table 38 caused cam 280 to rotate 90°, in particular, from its position shown in FIG. 36 to that shown in FIG. 35, which allowed the spool 324 of the selector valve 322 to move from its "in" position of FIG. 36 to its "out" position of FIG. 35 and thereby select the right pivotal platform 78.

Upon the second table 38 reaching its upright, tier-discharge position, the aforementioned suitable linkage, being generally similar to that of aforementioned U.S. Pat. No. 3,502,230, resets the second table trip 57 and moves the spool 360 of the second table valve 362 back to its "in" position. Line 364 is now connected to line 368 through check valve 366, which is connected by a pilot line 370 to line 134 and maintained open via the pressure of hydraulic fluid flowing from line 126 through the first table valve 124 with its spool 122 in its "out" position as shown in FIG. 34, along line 134 through second table valve 362 with its spool in its "in" position as shown in FIG. 34 and along line 369 to other hydraulic components (not shown) on the wagon 10. Therefore, the second table 38 may pivot back to its horizontal position under the force of gravity as hydraulic fluid is allowed to flow from its cylinder 52 along line 364. In this connection, it should be noted that if for some reason the spool 122 of the first table valve 124 were moved to its "in" position to connect pressure supply line 126 to line 130 and thus allow the flow of hydraulic fluid to first table cylinder 32 and cause pivotal movement of the first table 18 to its upright position, the pressure of hydraulic fluid flowing from supply line 136 to line 134 through the second table valve 362 to other hydraulic components via line 369 and also from line 134 into the check valve 366 along pilot line 370 would not be great enough to open the check valve 366 so as to allow reverse flow of hydraulic fluid along line 364 from the second table cylinder 52. Therefore, cylinder 52 will be maintained under pressure and the return pviotal motion of the second table 38 stopped to prevent it from descending and colliding with the first table 18 in the situation where the first table 18 is inadvertently simultaneously cycled to its upright position during the descent of the second table 38.

Pivotal return movement of the second table 38 from its upright tier-discharging position to its horizontal tier-forming position will cause the previously selected one of the two platforms, for instance, the right platform 78, to be moved to its forward, bale-receiving position.

In order to achieve the forward pivotal movement of the platforms 76,78 a first assembly of mechanical linkage, being indicated generally at 371, is provided and forms the part of the control means 350 for responding to the movement of the second table 38 and transmitting such motion to the platform control valve 352 to move its spool 354 from its "neutral" position of FIG. 34 to an "in" position. In its "in" position, the spool 354 connects pressure supply line 356 to line 340 and return line 358 to line 338 whereby hydraulic fluid flows to the right platform cylinder 88 along line 342 and from the cylinder 88 along line 344 and the cylinder 88 is moved to its retracted position which pivots the platform 78 to its forward position of FIG. 3 and 12.

The first assembly of mechanical linkage 371 of the control means 350 includes an arm 372 being pivotally mounted at 374 to a L-shaped bracket 376 fixed to right longitudinal channel 16 and having a roller 378 rotatably mounted at its upper free end and an outwardly protruding tab 380 fixed midway therealong between the roller 378 and its pivot point 374. The tab 380 has an opening through which is received a rear end portion of a connecting rod 382 which extends therefrom forward through an opening in the L-shaped bracket 376 and along right channel 16. A washer 384 is fixed near the terminal end of the connecting rod rear end portion and a spring 386 encompasses the rod 382 between the washer 384 and one side of the arm 372. Another spring 388 encompasses the rod 382 between the L-shaped bracket 376 and the other side of the arm 372. The connecting rod 382 extends forwardly from the opening in the L-shaped bracket 376 to a linking member, generally designated 390, with the forward end portion of the rod 382 being pivotally connected to the lower end of one side of the linking member 390 which is pivotally mounted at 392 to a C-shaped bracket 394 fixed to the longitudinal right channel 16. The opposite side of the linking member 390 is pivotally connected to the other end of the platform control valve spool 354.

Shortly after the second table 38 begins its descending pivotal movement, a T-shaped finger member 396 being fixed to, and extending rearwardly from, the right portion of upwardly extending rear leg portion 46 of the second table 38 (see also FIGS. 6 and 7) engages the forward side of the roller 378 on pivotal arm 372 and deflects or pivots the arm 372 counterclockwise, as seen in FIG. 11, through a small arc about point 374 such that the tab 380 on the arm 372 urges or compresses the spring 386 against the washer 384 on the connecting rod 382 which causes the rod 382 to move rearwardly and thereby pivot linking member 390 counterclockwise, as viewed in FIG. 10, about point 392. Such movement of member 390 results in movement of its opposite side toward the control valve 352 which moves the valve spool 354 from its "neutral" position to its "in" position.

It should be noted that during upward pivotal movement of the second table 38, the T-shaped finger member 396 would engage the rear side of the roller 378 on pivotal arm 372 and deflect or pivot it clockwise. However, such movement of the arm 372 merely compresses spring 388 against the bracket 376 and does not move the connecting rod 382. Once the finger member 396 passes the arm 372, the spring 388 restores the arm 372 to its centered, upright position of FIG. 11.

Pivotal return movement of the first table 18 from its upright bale-discharging position to its horizontal bale-receiving position will cause the previously selected one of the two platforms, for example, the right platform 78, if disposed in its forward position in which it has just received a pair of bales from the first table 18, to be rearwardly pivotally moved to its side, rail-forming position.

In order to achieve the rearward pivotal movement of the platforms 76,78 a second assembly of mechanical linkage, being indicated generally at 397, is provided and forms the part of the control means 350 for responding to the movement of the first table 18 and transmitting such motion to the platform control valve 352 to move its spool 354 from its "neutral" position of FIG. 34 to an "out" position. In its "out" position, the spool 354 connects pressure supply line 356 to line 338 and return line 358 to line 340 whereby hydraulic fluid flows to the right platform cylinder 88 along line 344 and the cylinder 88 is moved to its extended position which pivots the platform 78 from its forward position of FIGS. 3 and 13 to its side position of FIGS. 6 and 14.

The second assembly of mechanical linkage 397 of the control means 350 includes a connecting rod 398 which is pivotally secured at its rear end to the upper end of the one side of the linking member 390, extends forwardly along the channel 16, and is pivotally coupled at its front end to the lower end of a link 400 which, in turn, is pivotally mounted through its middle section at 402 to an upstanding C-shaped bracket 404 fixed to the right longitudinal channel 16. The upper end of the link 400 is pivotally secured to another rod 406 which is telescopically and slideably received at its forward end portion within the rearward end portion of a sleeve 408. The forward end of the sleeve 408 is pivotally coupled to the rear end of a link element 410 being pivotally mounted at 412 between a pair of spaced apart tabs 414 which are fixed to, and extend at an inclined angle upwardly and rearwardly from, the upper end of the first table leg portion 26 near the right front bracket 30. In the position shown in FIG. 11, the link element 410 is prevented from pivoting or rotating counterclockwise about point 412, as would otherwise be caused by the weight of the telescoping rod and sleeve assembly 406,408 imposed thereon, due to the presence of a transverse tab 416 which is fixed to the pair of tabs 414 and overlies the tabs 414 and the forward end of the link 410.

As the first table 18 is pivotally moved upwardly from its bale-receiving position to its bale-discharge position, the pair of tabs 414 carried by the upper end of the first table leg portion 26 and the link element 410 pivotally mounted by the tabs 414 together revolve in a counterclockwise direction about point 28 with the first table 18. Such movement of link element 410 may initally cause the sleeve 408 to slide relative to the rod 406 toward a stop element 418 adjustably mounted along the rod 406 a short distance from the rearward end of the sleeve 408. However, the link element 410 may also pivot or "break" through a small arc in a clockwise direction about its pivot point 412 relative to tabs 414, as the link element 410 revolves counterclockwise with the first table 18, such that the sleeve 408 is prevented from being slideably displaced rearwardly through a sufficient distance to engage the stop element 418 and move the rod 406 rearwardly which would pivot link 400 counterclockwise and pull connecting rod 398 forwardly, which would pivot linking member 390 clockwise and move the valve spool 354 from its "neutral" position to its "out" position.

However, as the first table 18 is pivotally returned from its upright position back to its horizontal position with the pair of tabs 414 carried by the upper end of the first table leg portion 26 and the link element 410 pivotally mounted by the tabs 414 together revolving in a clockwise direction about point 28 with the first table 18, the presence of transverse tab 416 prevents the link element 410 from pivoting or "breaking" in a counterclockwise direction about its pivot point 412. Accordingly, during the last 45° or so of the return cycle of the first table 18, the link element 410 causes the sleeve 408 to slide rearwardly relative to the rod 406 until it engages the stop 418, then the rod 406 moves rearwardly with the sleeve 408 through a sufficient distance to cause movement of the spool 354 of the platform control valve 352 from its "neutral" position to its "out" position via the other cooperating elements of the second mechanical linkage assembly 397 as explained hereinabove.

It has just been described hereinabove how the respective pivotal return movements of the second table 38 and the first table 18 control the pivotal movements of the selected one of the platforms 76,78 to its forward and side positions. In the case of pivotal return movement of the second table 38 to its lower, tier-forming position, the first assembly of mechanical linkage 371 caused movement of the valve spool 354 from its "neutral" position to its "in" position, while in the case of pivotal return movement of the first table 18 to its lower, bale-receiving position, the second assembly of mechanical linkage 397 cause movement of the valve spool 354 from its "neutral" position to its "out" position. It was not explained in the description just presented how the spool 354 of the platform control valve 352 became initially set at, or is returned to, its "neutral" position. It will be recognized by one skilled in the art that control valve 352 as shown in FIG. 34 is a self-neutralizing, detent type valve. Each time the spool 354 is moved to either its "in" or its "out" position, a stationary spring loaded element 420 within the valve becomes engaged within one of a pair of detents on the valve spool and holds the spool at either the "in" or "out" position. The spool is maintained at such position until a predetermined level of back pressure higher than the pressure required to either extend or retract the selected one of platform cylinders 88,89 builds along the pressure supply line 356. Such level of back pressure is reached after the respective selected one of the platform cylinders 88,89 has reached either its fully extended or retracted position and instantaneously opens internal relief valve 422 which allows hydraulic fluid to flow along internal line 424 to the internal spring loaded, detent-engaging element 420 and lift the element 420 against its spring loaded bias out of engagement with the respective one of the detents. Once the element 420 is disengaged from the one detent, the spool 354 is free to return to its normal centered position as shown in FIG. 34 due to the inherent action of internal spring means within the valve 352. Also, once the spool 354 has returned to its "neutral" position, the flow of hydraulic fluid will divert to the path of least resistance which is along return line 358 leading back to the tank 345. Fluid pressure along internal line 424 of the control valve 352 will also seek the path of least resistance which is away from the detent-engaging element 420 and along restricted flow line 426 being connected to return line 358. In such manner the fluid pressure which previously was utilized to counteract the spring loaded bias of the detent-engaging element 420 in order to neutralize the valve 352 is allowed to drain off whereby the detent-engaging element 420 will again be capable of engaging one of the detents upon movement of the spool 354 to one of its "in" or "out" positions.

It should be mentioned that each time the first table 18 is pivotally moved on its return cycle, the spool 354 of the control valve 352 is moved from its "neutral" position to its "out" position. As stated hereinabove, if the selected one of the platforms 76,78 happens to be disposed in its forward position, such as at the start of the formation of one of the tier patterns F, S, movement of the valve spool 354 to its "out" position causes extension of the one of the cylinders 89,88 corresponding to the selected one of the platforms 76,78 and thus pivotal movement of the selected one platform to its side position, and then the valve 352 neutralizes itself. However, the one selected platform is only disposed in its forward position for receiving bales from the first table 18 the first time the first table 18 is cycled during a given one of the tier-forming operations. Thereafter, the selected platform is disposed in its side, rail-forming position as additional pairs of transversely-arranged bales are successively delivered to the second table 38 by the first table 18. During the return portion of each one of these cycles of the first table 18, being subsequent to the first cycle thereof, the valve spool 354 is moved to its "out" position, but since the selected one hydraulic cylinder is already extended, this has no effect on the position of the selected platform. Instead, as soon as the spool 354 moves to its "out" position, the back pressure is instantaneously "sensed," as has been explained hereinabove, by the neutralizing or restoring features of the valve 352, i.e., the detent-engaging element 420 and the internal relief valve 422, and the control valve 352 immediately neutralizes itself.

Referring again to FIGS. 10 and 11, addition mechanical linkage, generally designated as numeral 428, is provided, the purpose for which is to prevent successive cycling of the second table 38 without interposing a first table cycle between the second table cycles. It has been explained that each cycle of the second table 38 causes pivotal movement of the selected platform from its side position to its forward position. Also, it has been explained that the platforms 76,78 are selected in alternating fashion by the pivotal cycles of the second table 38. Thus, for example, on one given cycle of the second table 38, the right platform 78 may be slected and then moved to its forward position. If the first table 18 is not cycled before another cycle of the second table 38 takes place, then the previously selected right platform 78 will not be moved from its forward position, but, instead, the subsequent cycle of the second table 38 will select the other, left platform 76 and then move it toward its forward position, while the non-selected right platform 78 is being maintained at its forward position. Thus, it is readily apparent that the left platform 76 will collide with the right platform 78 and possibly cause damage to one or both of the platforms, to components associated therewith, or to components of the hydraulic system.

The additional mechanical linkage 428 includes a shaft 430 being rotatably mounted to, and extending along, the transverse support member 432 being fixed to the front brackets 30 which extend upright from the longitudinal left and right channels 16. At an inner end of the shaft 430, which is generally disposed midway along the length of the support member 432, is fixed an upright arm 434 which will extend through a slot 436, as seen in FIG. 6, formed at a central location along the front edge of the second table 38 and above the surface of the second table 38 when the second table 38 is in its horizontal tier-forming position with its forward transversely-extending edge generally resting on the support member 432 so as not to interfere with rotatably shaft 430. The upright arm 434 has a roller 438 rotatably mounted at its upper end. The opposite outer end of the shaft 430 is formed in a 90 degree turned portion 440 which has an end of a cable 442 fixed thereto. The cable 442 extends downwardly from the turned portion 440 about a sheave 444 being rotatably mounted to right upright bracket 30 and therefrom rearwardly to the upper, inwardly-projecting end of a L-shaped lock lever 446 being pivotally mounted at 448 to the right longitudinal channel 16. A lower outwardly-projecting end 450 of the lever 446 overlies a rod 452, being only fragmentarily shown, which is coupled to the spool 360 of the second table valve 362, not being shown in FIGS. 10 and 11.

When the selected one of the platforms 76,78 is moved to its forward position, the platform engages the roller 438 and pivots the upright arm 434 clockwise, as viewed in FIG. 11, which correspondingly rotates the shaft 430 and the turned portion 440 of the shaft 430 clockwise. Clockwise rotation of the turned shaft portion 440 pulls the cable 442 forwardly which pivots the lever 446 clockwise to position its lower end 450, having a semicircular groove formed therein, partially about the rod 452 just rearwardly of a stop element 454 being adjustably fixed at a desired predetermined position along the rod 452. With the lever end 450 so positioned, the spool 360 of the second table valve 362 is locked in the position shown in FIG. 34 and may not be moved so as to cause cycling of the second table 38. For example, the operator of the wagon 10 will not now be able to operate certain remote control rods (not shown) which are normally positioned at the front of the wagon in order to manually cycle the second table. He must first cycle the first table 18 which will cause the selected platform to move to its side position and thus out of the path of the other platform which will be selected and moved forwardly on the next second table cycle. A spring 456 extending between the C-shaped bracket 404 and the upper end of the lever 446 will pivotally return the lever 446 counterclockwise to its initial position which rotates the upright arm 434 back to its original, generally vertical position and also raises the lower lever end above the stop element on the rod 452, once the selected platform disengages from the roller 438 of the arm 434. Thus, it is seen that provision has been made for preventing inadvertent consecutive cycling of the second table 38 in order to avoid colliding or crashing one platform with the other.

FUNCTIONS OF OTHER HYDRAULIC COMPONENTS

It should be pointed out that, with respect to the hydraulic circuit of FIG. 34, lines which cross are connected together whenever a large dot appears at the location of intersection; otherwise crossing lines are not connected. Other than the above variation, the hydraulic circuit of FIG. 34 is in conformity with the standard graphical symbols specified by USASI.

It was stated hereinbefore that the trip slave cylinder 194 is moved to its extended position, as shown in FIG. 4, and the inner trip lever 184 is caused thereby to pivot or raise to its operative position of FIG. 5, each time the right platform hydraulic cylinder 88 is actuated to its extended position, as shown in FIG. 6, and the right platform 78 is thus pivotally moved from its forward to its side position. Also explained above, actuation of the right platform cylinder 88 to its extended position is caused by hydraulic fluid which is flowing from the supply line 356 through the right end of control valve spool 354, being at its "out" position, along line 338 through the left end of selector valve spool 324, being at its "out" position of FIG. 34, and along line 342 to the right platform cylinder 88. A small portion of the hydraulic fluid flowing along line 342 from the selector valve spool 324 diverts along line 458, opens and passes through the spring loaded check valve 460, and then along line 196 toward the trip slave cylinder 194 to move the cylinder 194 from its retracted position of FIG. 34 to its extended position of FIG. 4. The fluid is prevented from flowing in an opposite direction along line 196 to line 462 which leads to the tank 345 by the presence of a pilot operated check valve 464 normally closed to flow in such direction along line 196. As will be explained in detail later, any fluid present along pilot line 466, which connects check valve 464 to line 468 which, in turn, connects to line 348 which leads to the left platform cylinder 89, is not at a level of pressure sufficient to open the check valve 464. Thus, it will be apparent that the presence of closed check valves 460,464 prevents reverse flow of fluid from the extended hydraulic slave cylinder 194 so long as the selector valve spool 324 remains at its "out" position of FIGS. 34 and 35. Accordingly, the inner trip lever 184 will be maintained in its raised operative position so long as the selector valve spool 324 remains at its "out" position.

Further, even upon the next pivotal cycling of the second table 38 which moves selector valve spool 324 from its "out" position to its "in" position of FIG. 36 and, following thereafter, moves the control valve spool 354 from its "neutral" to its "in" position which allows fluid flow from supply line 356 through the left end of control valve spool 354 to line 340 through the right end of selector valve spool 324 and along line 346 to left platform cylinder 89 to cause retraction thereof and pivoting of the left platform 76 to its forward position, the inner trip lever will be maintained in its raised operative position since the check valves 460,464 are not affected and thus remain closed.

It is only upon the next succeeding cycle of the first table 18, after the initial pair of bales have been delivered to the second table 38 upon the forwardly-positioned left platform 76 by the first table 18 to begin formation of tier pattern S and when the first table 18 returns to its lower bale-receiving position which causes control valve spool 354 to move from its "neutral" position to its "out" position and thereby causes extension of the left platform cylinder 89 and pivotal movement of the left platform 76 to its side position of FIG. 3, that the normally closed check valve 464 is opened to allow reverse flow of fluid from the slave cylinder 194 along line 196 to line 462 and onto the tank 345 and thus retraction of slave cylinder 194 and return pivoting of the inner trip lever 184 to its lower, inoperative position below the level of first table beams 20. The normally closed check valve 464 is opened when fluid flows from supply line 356 through the right end of control valve spool 354 to line 338 through the right end of selector valve spool 324 and along line 348 to left platform cylinder 89 to cause extension thereof and pivoting of the left platform 76 to its side position, since a small portion of the hydraulic fluid flowing along line 348 from the selector valve spool 324 diverts along line 468 to pilot line 466 and therealong to check valve 464. The flow of fluid along line 468 diverts to pilot line 466, instead of flowing on directly to return line 462, in view of the presence of a pilot operated check valve 470 normally closed to flow in such direction along line 468. The flow of fluid along pilot line 466 to check valve 464 reaches a level of pressure sufficient to open the check valve 464 whereby the line 196 is now open to the return line 462 which allows the fluid pressure previously maintained within the slave cylinder 194 and holding it in its extended condition to evacuate to the tank 345 due to the inherent contractive action of the extended spring 198, the fluid being pushed from the cylinder 198 upon its retraction by the spring 198.

It should be recognized that upon the left platform cylinder 89 reaching its fully extended position with the left platform 76 then at its side position, the platform control valve spool 354 will automatically neutralize, in a manner as has been explained hereinbefore, and the fluid pressure along pilot line 466, which was previously built up to a level sufficient to open check valve 464, will not be maintained and held at such level. Further, it should be recognized that subsequent cycles of the first table 18 to complete formation of tier pattern S, which each cause the control valve spool 354 to move from its "neutral" position to its "out" position, with the spool then "self-neutralizing," all without any effect upon the extended condition of the left platform cylinder 89, as has been explained hereinbefore, will not connect line 348, and thus line 468, to line 340, which connects to return line 358 each time the spool 354 moves to its "out" position, and, therefore, will not evacuate the fluid pressure in pilot line 466 which is maintaining the check valve 464 in its open condition.

However, some provision must be made to relieve the fluid pressure along pilot line 466 so as to allow the check valve 464 to restore or return to its initial condition, such being where it is normally closed to fluid flow along line 196, before the appropriate stage in the succeeding operation of forming the tier pattern F arrives in which it is again necessary to raise the inner trip lever 184 to its operative position of FIG. 5 by extending the slave cylinder 194. So long as the check valve 464 remains open to fluid flow along line 196, it will be impossible to extend the slave cylinder 194.

Such provision for restoring the check valve 464 to its closed condition takes the form of a pilot line 472 connected check valve 470 and line 364 which leads to the second table cylinder 52. Upon cycling of the second table 38 to its upper, tier-discharging position after the selected tier pattern S has been completed thereon, a small portion of the fluid flowing along line 364 to the second table cylinder 52 diverts along pilot line 472 and reaches a level of pressure sufficient to open check valve 470 to fluid flow along line 468 through check valve 470 and therefrom along return line 462 to the tank 345. As a result, the fluid pressure present in check valve 464, and heretofore maintaining it open, will bleed off along pilot line 466 to line 468 through open check valve 470 and then along return line 462 to the tank 345, and thereby restore the check valve 464 to its initial condition wherein it is closed to fluid flow from line 196.

To limit the rate of flow to the return line 462, a restriction 474 is placed in the short portion of line 468 between check valve 470 and the point of connection of line 468 with return line 462. Such restriction 474 is designed to allow flow therethrough sufficient enough to achieve bleeding off of the fluid pressure in pilot line 466 when the check valve 470 is opened, but to limit the flow sufficiently so that back pressure will be created along interconnected lines 468, 348 and 338 at a level sufficient enough to make the control valve 352 neutralize itself after its spool 354 haas been moved to its "out" position as caused by return movement of the first table 18 to its horizontal position during the first approximately 45° of pivotal movement of the second table 38 toward its upright, tier-discharging position. Thereby, the control valve 352 will be neutralized before the second table 38 moves through the final approximately 45° of its upward cycle in which it causes the selector valve 322 to change selection from the left to the right platform and, thereafter, moves through its downward cycle in which it causes the control valve spool 354 to move to its "in" position to pivotally move the selected right platform to its forward position.

It has been found desirable to allow flow of hydraulic fluid to the selected one of the right or left platform cylinders 88, 89 to assist in holding the corresponding selected one of the right or left platforms 78, 76 solidly at its forward position during pivotal movement of the first table 18 to its upright, bale-discharge position at which a pair of bales are delivered to the selected one of the plaforms 78,76. Oftentimes, if such flow is not provided, the selected one platform has a tendency to be slightly pivoted rearwardly due to engagement therewith by the bales being delivered by the first table 18, that is, the bales in being pushed or dragged across the front end of the second table 38 tend to push the respective selected one platform ahead of them and thereby displace the platform rearwardly out of the desired alignment along the front end of the second table 38. As a result the pair of bales may not be wholly resting on the platform when it is pivoted to its side position and may roll of the platform and thereby not reach the side, rail-forming position for the selected one of the tier patterns F, S. This would require the operator to stop the bale wagon and manually arrange the bales in the respective side rail position.

A short line 476 interconnects lines 130 and 340 and a spring loaded check valve 478 is provided along line 476 which only allows fluid flow in a direction away from the point at which lines 130, 132 and 476 are connected. Whenever the first table valve spool 122 has been moved to its "in" position which allows the flow of hydraulic fluid from supply line 126 through the right end of the spool 122 to line 130 and then along line 132 to the first table cylinder 32 to move the cylinder 32 to its extended position which pivots the first table 18 to its upright, bale-discharge position, additional fluid pressure, over and above that which is already present therealong, is imposed through check valve 478 and along line 340 through the selector valve 322 and along one of the lines 342,346 to the corresponding selected one of the platform cylinders 88,89 being disposed in its retracted position to assist in maintaining such retracted position during placing of the pair of bales on the selected, forwardly-positioned one of the platforms 78,76.

FORMING BALES INTO TWO ALTERNATING, INTERLOCKING TIER PATTERNS ON THE SECOND TABLE OF THE BALE WAGON

FIGS. 12 through 19 and 20 through 27 schematically illustrate the operations of forming bales into the first and second interlocking tier patterns F, s on the second table 38 of the bale wagon 10 of FIG. 1 as the bale wagon 10 moves across the field. Reference numerals have been omitted for purposes of clarity from FIGS. 12 through 27 (and also from FIGS. 28 through 33), since the basic components involved in the operations have been identified in FIG. 3.

Figure 14:
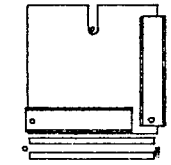

Since formation of bales into tier pattern F has been selected first and is illustrated in FIGS. 12 through 19, the right platform 78 is at its formward position and the left platform 76 is at its side position, as illustrated in FIG. 12. Also, inner trip lever 184 is disposed in its lower, inoperative position. The operations begin with two bales being successively delivered along the first table 18 until both trip lock lever 158 is depressed and outer trip lever 104 is pivotally moved to the left. Then, the first table 18 is actuated to pivot to its upright, bale-discharging position to deliver the pair of bales to the second table 38 and thereby dispose the pair on the right platform 78 with the pair being arranged end-to-end in a row thereon, as shown in FIG. 13. Return movement of the first table 18 back to its horizontal, bale-receiving position causes pivotal movement of the right platform 78 and its pair of bales to the side position, as shown in FIG. 14, being generally perpendicular to the initial forward position, which provides the right pair of rail bales R for the tier pattern F. Upon such pivotal movement of the right platform 78, the inner trip lever 184 is actuated to its raised, operative position.

To complete formation of the tier pattern F, like pairs of bales are each successively delivered along the first table 18 until trip lock lever 158 is depressed, bale position sensing arm 236 senses the passage of the right end of the pair (or override device 261 is actuated in the case of an overly long bale), and inner trip lever 184 is pivoted to the left and then delivered by the first table 18 to the second table 38 and thereby disposed or accumulated in transverse relationships along one longitudinally-extending side of the right pair of rail bales R and generally between opposite ends of the pair, as shown in FIGS. 15 through 19.

Figure 20:
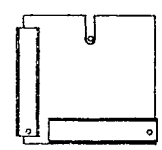
Figure 24:
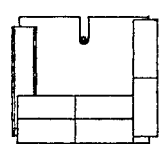
Figure 16:
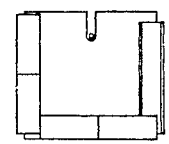
Figure 30:
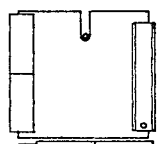

When the final pair of bales is delivered to the second table 38 to complete the tier pattern F, the rearwardly-positioned transverse pair of bales of the tier pattern F engaged and move the second table trip lever 57 rearwardly which actuates pivotal movement of the second table 38 to its upright, tier-discharging position adjacent the load bed to dispose the tier of bales upright upon the load bed. Return movement of the second table 38 back to its horizontal, tier-forming position causes pivotal movement of the left platform 76 to the forward position with the right platform 78 being maintained at the side position, as illustrated in FIG. 20, and, also, the inner trip lever 184 is still maintained in its raised, operative position.

Figure 22:
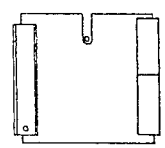
Figure 26:
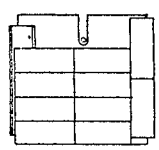
Figure 18:
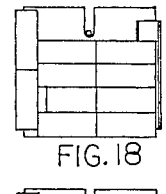
Figure 32:
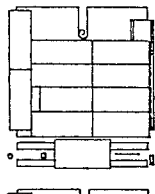
FIGS. 30 and 32 are schematic representations of intermediate steps occurring between those steps illustrated in FIGS. 16 and 17, showing a pair of bales being successively received by the first table where one of the bales is significantly shorter than the standard bale length.
Figure 21:
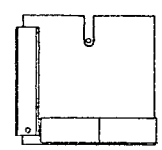
Figure 25:
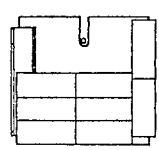

Accordingly, formation of bales into the other, second tier pattern S, which had been selected by the prior upward movement of the second table 38 in delivering tier F to the load bed, is now carried out and is illustrated in FIGS. 20 through 27. The operations begin with two bales being successively delivered along the first table 18 as the like pairs of bales were previously each successively delivered along the first table 18 to complete formation of the tier pattern F. Then, the first table 18 is actuated to pivot to its upright, bale-discharging position to deliver the pair of bales to the second table and thereby dispose the pair of left platform 76 with the pair being arranged end-to-end in a row thereon, as shown in FIG. 21. Return movement of the first table 18 back to its horizontal, bale-receiving position causes pitoval movement of the left platform 76 and its pair of bales to the side position, as shown in FIG. 22, being generally perpendicular to the initial forward position, which provides the left pair of rail bales L for the tier pattern S. Upon such pivotal movement of the left platform 76, the inner trip lever 184 is actuated to its lower, inoperative position.

To complete formation of the tier pattern S, like pairs of bales are each successively delivered along the first table 18 until both trip lock lever 158 is depressed and outer trip lever 104 is pivotally moved to the left and then delivered by the first table 18 to the second table 38 and thereby disposed or accumulated in transverse relationships along a longitudinally-extending side of the left pair of rail bales L, being located opposite to the one longitudinal side of the right pair of rail bales R, and generally between opposite ends of the pair, as shown in FIGS. 23 through 27.

When the final pair of bales is delivered to the second table 38 to complete the tier pattern S, the rearwardly-positioned transverse pair of bales of the tier pattern S actuates the second table trip lever 57, as in the case of the tier pattern F, which causes pivotal movement of the second table 38 to its upright, tier-discharging position adjacent the load bed to deposit the tier S upright upon the load bed in general alignment with the tier F such that the right rail bales R of tier F and the left rail bales L of tier S are respectively disposed at opposite sides of the adjacently deposited tiers F, S.

Additional interlocking tiers F, S are successively and alternatively formed and deposited onto the load bed by repeating the above-described operations until a stack having the desired number of tiers has been formed on the load bed of the bale wagon. Then, the bale wagon 10 is moved to a desired storage location, whereupon the load bed is pivoted 90° to its upright position, pushoff feet (not shown) are actuated and the wagon is moved forwardly which deposits the stack upright upon the ground or the like, as it is shown in FIG. 2.

It is thought that the invention and many of its attendant advantages will be understood from the foregoing description and it will be apparent that various changes may be made in the form, construction and arrangement of the components of the bale wagon described and that changes may be made in the steps of the method described and their order of accomplishment without departing from the spirit and scope of the invention or sacrificing all of its materials advantages, the form hereinbefore described being merely a preferred or exemplary embodiment thereof.

Having thus described the invention, what is claimed is:

1. A method of forming bales on a bale wagon into a tier pattern being approximately two and one-half bales wide, said bale wagon having a pivotally-mounted tier-forming table, a pivotally-mounted bale-receiving table positioned forwardly along a bale-receivingg end of said tier-forming table and an elongated platform having a length and width generally corresponding to that of a pair of bales being arranged end-to-end in a row and being pivotally mounted at its one end adjacent one of two opposite sides, and said bale-receiving end, of said tier-forming table through a distance from the other of said sides of said tier-forming table approximately equal to the length of two and one-half bales, comprising the steps of:

pivotally moving said tier-forming table to a horizontal position, said movement of said tier-forming table actuating said platform to pivotally move to a forward position along said bale-receiving end of said tier-forming table;

pivotally moving said bale-receiving table from a horizontal position to a generally upright position when one pair of bales has been received on said bale-receiving table in a transverse position aligned with said platform for placing said one pair on said platform;

pivotally moving said bale-receiving table from its upright position back to its horizontal position, said movement of said bale-receiving table actuating said platform to pivotally move with said one pair of bales thereon from its forward position to a side position along said one side of said tier-forming table for disposing said one pair in a longitudinal position to thereby form a pair of rail bales of said tier pattern on said tier-forming table;

maintaining said platform at its side position along said one side of said tier-forming table; and successively pivotally moving said bale-receiving table from its horizontal position to its upright position and back to its horizontal position as pairs of bales in a plurality thereof, being like said one pair, are successively received on said bale-receiving table in another transverse position therealong, being offset from said transverse position of said one pair and aligned between said other side of said tier-forming table and longitudinal side of said pair of rail bales facing said other side of said tier-forming table, for successively placing said like pair in said plurality thereof on said tier-forming table in transverse relationships along said one longitudinal side of said pair of rail bales of said tier pattern and generally between opposite ends thereof to thereby complete the formation of said tier pattern on said tier-forming table.

2. A method of forming bales into a pair of alternating and interlocking tier patterns on a bale wagon, each being approximately two and one-half bales wide, said bale wagon having a pivotally-mounted tier-forming table, a pivotally-mounted bale-receiving table positioned forward along a bale-receiving end of said tier-forming table, a load-carrying bed positioned rearwardly of said tier-forming table and a pair of elongated platforms, each having a length and width generally corresponding to that of a pair of bales being arranged end-to-end in a row and being pivotally mounted at its one end adjacent one of two opposite sides, and said bale-receiving end, of said tier-forming table through a distance from the other platform approximately equal to the length of two and one-half bales, comprising the steps of:

pivotally moving said tier-forming table to a horizontal position, said movement of said tier-forming table actuating one of said platforms to pivotally move to a forward position along said bale-receiving end of said tier-forming table;

maintaining the other of said platforms at a side position along one of said sides tier-forming table;

pivotally moving said bale-receiving table from a horizontal position to a generally upright position when one pair of bales has been received on said bale-receiving table in a transverse position alinged with said one platform for placing said one pair on said one platform;

pivotally moving said bale-receiving table from its upright position back to its horizontal position, said movement of said bale-receiving table actuating said one platform to pivotally move with said one pair of bales thereon from its forward position to another side position along the other of said sides of said tier-forming table for disposing said one pair in a longitudinal position to thereby form a pair of rail bales of a first of said pair of tier patterns on said tier-forming table;

maintaining said one platform at its another side position along said other side of said tier-forming table;

successively pivotally moving said bale-receiving table from its horizontal position to its upright position and back to its horizintal position as pairs of bales in one plurality thereof, being like said one pair, are successively received on said bale-receiving table in another transverse position therealong, being offset from said transverse position of said one pair and aligned between said one side of said tier-forming table and one longitudinal side of said pair of rail bales facing said one side of said tier-forming table, for successively placing said like pairs in said one plurality thereof on said tier-forming table and across said other platform, being maintained along said one side of said tier-forming table, in transverse relationships along said one longitudinal side of said pair of rail bales of said first tier pattern and generally between opposite ends thereof to thereby complete the formation of said first tier pattern on said tier-forming table;

pivotally moving said tier-forming table with said completed first tier pattern thereon to a generally upright position for depositing said first tier pattern of bales on said load bed;

pivotally moving said tier-forming table back to its horizontal position said movement of said tier-forming table actuating said other platform to pivotally move to another forward position along said bale-receiving end of said tier-forming table, said another forward position being offset from said forward position of said one platform;

maintaining said one platform at its another side position along said other side of said tier-forming table;

pivotally moving said bale-receiving table from its horizontal position to its upright position when another pair of bales, being like said one pair, has been received on said bale-receiving table in said another transverse position therealong being aligned with said other platform for placing said another pair on said other platform;

pivotally moving said bale-receiving table from its upright position back to its horizontal position, said movement of said bale-receiving table actuating said other platform to pivotally move with another pair of bales thereon from its another forward position to its side position along said one side of said tier-forming table for disposing said another pair in another longitudinal position to thereby form a pair of rail bales of a second of said pair of tier patterns on said tier-forming table;

maintaining said other platform at its one side position along said one side of said tier-forming table;

successively pivotally moving said bale-receiving table from its horizontal position as pairs of bales in another plurality thereof, being like said one pair, are successively received on said bale-receiving table in said transverse position being aligned between said other side of said tier-forming table and another longitudinal side of said pair of rail bales of said second tier pattern, being opposite to said one longitudinal side of said pair of rail bales of said first tier pattern and facing said other side of said tier-forming table, for successively placing said like pairs in said another plurality thereof on said tier-forming table and across said one platform, being maintained along said other side of said tier-forming table, in transverse relationships along said other longitudinal side of said pair of rail bales of said second tier pattern and generally between opposite ends thereof to thereby complete the formation of said second tier pattern on said tier-forming table; and pivotally moving said tier-forming table with said completed second tier pattern thereon to its upright position for depositing said second tier pattern adjacent said first tier pattern on said load bed in general alignment therewith to form an interlocking pair of alternating tier patterns wherein said pair of rail bales in said first tier pattern and said pair of rail bales in said second tier pattern are respectively disposed at opposite sides of said adjacently deposited first and second tier patterns.

3. A method as recited in claim 2, wherein:

said pivotal movement of said tier-forming table to its upright position upon completion of the formation of said second tier pattern selects said one platform for actuation; and said pivotal movement of said tier-forming table to its upright position upon completion of the formation of said first tier pattern selects said other platform for actuation.

4. A method as recited in claim 3, wherein:

following selection of said one platform for actuation, pivotal movement of said tier-forming table to its horizontal position actuates said pivotal movement of said one platform to its forward position and the next following pivotal movement of said bale-receiving table from its upright position back to its horizontal position actuates said pivotal movement of said one platform to its another side position from its forward position; and following selection of said other platform for actuation, pivotal movement of said tier-forming table to its horizontal position actuates said pivotal movement of said other platform to its another forward position and the next following pivotal movement of said bale-receiving table from its upright position back to its horizontal position actuates said pivotal movement of said other platform to its side position from its another forward position.

5. A method as recited in claim 3, wherein:

selection of said one platform for actuation maintains said other platform at its side position along said one side of said tier-forming table; and selection of said other platform for actuation maintains said one platform at its another side position along said other side of said tier-forming table.

6. Apparatus on a bale wagon for forming bales into a tier pattern being approximately two and one-half bales wide, comprising:

a tier-forming table mounted on said bale wagon;

an elongated platform having a length and width generally corresponding to that of a pair of bales being arranged end-to-end in a row and being pivotally mounted at its one end adjacent one of two opposite sides, and a bale-receiving end, of said table through a distance from the other of said sides of said table approximately equal to the length of two and one-half bales, said platform being disposed in a forward, bale-receiving position along said bale-receiving end of said table and pivotally moveable to a side, rail-forming position along said one side of said table;

a bale-receiving table mounted on said bale wagon forwardly along said bale-receiving end of said tier-forming table, said bale-receiving table being pivotally moveable from a generally horizontal, bale-receiving position to a generally upright, bale-discharging position adjacent said bale-receiving end of said tier-forming table and back to said horizontal, bale-receiving position for transferring a pair of bales being arranged end-to-end in a row onto said platform when said platform is disposed at its forward position and for successively transferring like pairs of bales onto said tier-forming table in transversed relationships along one longitudinal side of said platform and of said pair of bales thereon when said platform is disposed at its side position; and means actuated by the pivotal movement of said bale-receiving table from its upright position to its horizontal position for causing pivotal movement of said platform from its forward position to its side position.

7. Apparatus as recited in claim 6, further comprising:

first means mounted on said bale wagon for actuating said bale-receiving table when a pair of bales is received therealong in general alignment with said platform when said platform is disposed at its forward position; and second means mounted on said bale wagon in an inoperative position and moveable to an operative position for actuating said bale-receiving table when each of said like pairs of bales in received therealong in general alignment between said other side of said tier-forming table and said one longitudinal side of said platform and of said pair of bales thereon when said platform is disposed at its side position, said second means being coupled to said platform moving means for causing said second means to move to its operative position when said platform moving means causes said platform to move from its forward position to its side position.

8. A bale wagon for forming bales into a pair of alternating and interlocking tier patterns, each tier pattern being approximately two and one-half bales wide, comprising:

a chassis;

a load-carrying bed mounted on said chassis;

a tier-forming table mounted on said chassis forwardly of said load bed, said table being pivotally moveable from a generally horizontal, tier-forming position to a generally upright, tier-discharging position adjacent a tier-receiving end of said load bed and back to its horizontal position for transferring bales being arranged in one of said pair of tier patterns onto said load bed;

a pair of elongated platforms, each platform having a length and width generally corresponding to that of a pair of bales arranged end-to-end in a row and being mounted at its one end adjacent one of two opposing sides, and a bale-receiving end, of said table through a distance from the other platform approximately equal to the length of two and one-haf bales, each platform being pivotally moveable between a forward, bale-receiving position in which it is disposed along said table end at a location transversely offset from the forward position of the other platform and a side, rail-forming position in which it is disposed along its corresponding one table side, only one of said platforms being disposable at its respective bale-receiving position at a time;

a bale-receiving table mounted on said chassis forwardly along said bale-receiving end of said tier-forming table, said bale-receiving table being pivotally moveable from a generally horizontal, bale-receiving position to a generally upright, bale-discharging position adjacent said bale-receiving end of said tier-forming table and back to its horizontal position for transferring a pair of bales being arranged end-to-end in a row onto either one of said platforms when said one platform is disposed at its forward, bale-receiving position and for successively transferring like pairs of bales onto said tier-forming table in transverse relationships along one longitudinal side of said one platform and of said pair of bales thereon and across said other of said platforms being disposed in its respective side position when said one platform is disposed at its rail-forming position along said respective table side with said pair of bales thereon;

means coupled to said tier-forming table and actuated by the pivotal movement of said table from its upright position to its horizontal position for causing pivotal movement of one of said platforms from its side position to its forward position, said means along being coupled to said bale-receiving table and actuated by the pivotal movement of said table from its upright position to its horizontal position for causing pivotal movement of one of said platforms from its forward position to its side position; and means coupled to each of said platforms and actuated by pivotal movement of said tier-forming table from its horizontal position to its upright position for alternatively coupling of one of said platforms to said platform means to thereby achieve alternating formation of said tier patterns.

9. A bale wagon as recited in claim 8, wherein said platform coupling means, when actuated to couple one of said platforms to said platform moving means, uncouples the other of said platforms from said platform moving means and thereby maintains said other platform at its side position.

10. A bale wagon as recited in claim 8, wherein said bale-receiving table has a bale-receiving end located adjacent one of said two sides of said tier-forming table, and said bale wagon further comprises:

first means mounted on said chassis for actuating said bale-receiving table when a pair of bales is received therealong in general alignment with the one of said platforms being pivotally mounted adjacent the other of the two sides of said tier-forming table when said one platform is disposed at its forward position and when a pair of bales is received therealong in like general alignment between said other side of said tier-forming table and one longitudinal side of the other of platforms being pivotally mounted adjacent said one side of said tier-forming table when said one platform is disposed at its side position; and second means mounted on said chassis in a inoperative position and moveable to an operative position for actuating said bale-receiving table when a pair of bales is received therealong in general alignment between said one side of said tier-forming table and one longitudinal side of said other platform when said other platform is disposed at its side position and when a pair of bales is received therealong in like general alignment with said other platform when said other platform is disposed at its forward position, said second means being actuated by said platform moving means to move to its operative position when said platform moving means causes said one platform to move from its forward position to its side position during formation of one of said tier patterns, said second means being maintained at its operative position until said platform moving means is coupled to said other platform during formation of the other of said tier patterns and causes said other platform to move from its forward position to its side position.

11. A method of forming bales on a bale wagon into a tier pattern, said bale wagon having a tier-forming table, bale-receiving means positioned along a bale-receiving end of said tier-forming table and including moveable means, and an elongated platform capable of receiving a predetermined number of bales and being pivotally mounted at its one end adjacent one of two opposite sides, and said bale-receiving end, of said tier-forming table, comprising the steps of:

positioning said platform at a forward position along said bale-receiving end of said tier-forming table for receiving said predetermined number of bales;

moving said moveable means of said bale-receiving means from a bale-receiving position to a bale-discharging position when said predetermined number of bales have been received by said bale-receiving means in a transverse position aligned with said platform for placing said predetermined number of bales on said platform;

moving said moveable means from its bale-discharging position back to its bale-receiving position, said movement of said moveable means actuating said platform to pivotally move with said predetermined number of bales thereon from its forward position to a side position along said one side of said tier-forming table for disposing said predetermined number of bales in a longitudinal position on said tier-forming table; and successively moving said moveable means from its bale-receiving position to its bale-discharging position and back to its bale-receiving position as additional predetermined numbers of bales are successively received by said bale-receiving means in another transverse position, being offset from said transverse position of said first predetermined number of bales and aligned between the other side of said tier-forming table and one longitudinal side of said first predetermined number of bales facing said other side of said tier-forming table, for successively placing said additional predetermined numbers of bales on said tier-forming table in transverse relationships along said one longitudinal side of said first predetermined number of bales.

12. A method as recited in claim 11, wherein said tier-forming table is movably mounted on said bale wagon, and further comprising the steps of moving said tier-forming table to a tier-forming position, and, during said movement of said tier-forming table, actuating said platform to pivotally move to said forward position along said bale-receiving end of said tier-forming table.

13. A method as recited in claim 12, wherein said movement of said tier-forming table to its tier-forming position actuates said pivotal movement of said platform to its forward position.

14. Apparatus on a bale wagon for forming bales into a tier pattern, comprising:
a tier-forming table mounted on said bale wagon;
an elongated platform capable of receiving a predetermined number of bales and being pivotally mounted at its one end adjacent one of two opposite sides, and a bale-receiving end, of said table, said platform being disposed in a bale-receiving position along said bale-receiving end of said table and pivotally moveable to a rail-forming position along said one side of said table;
bale-receiving means mounted on said bale wagon along said bale-receiving end of said tier-forming table and including moveable means, said moveable means being moveable from a bale-receiving position to a bale-discharging position adjacent said end of said tier-forming table and back to said bale-receiving position for transferring said predetermined number of bales onto said platform when said platform is disposed at its bale-receiving position and for successively transferring additional predetermined numbers of bales onto said tier-forming table in transverse relationships along one longitudinal side of said platform and of said predetermined number of bales thereon when said platform is disposed at its rail-forming position; and
means actuated by said movement of said moveable means of said bale-receiving means from its bale-discharging position to its bale-receiving position for causing pivotal movement of said platform from its bale-receiving position to its rail-forming position.

15. A bale wagon for forming bales into a plurality of tier patterns, comprising:
a chassis;
a load-carrying bed mounted on said chassis;
a tier-forming table mounted on said chassis and being moveable from a tier-forming position to a tier-discharging position adjacent a tier-receiving end of said load bed and back to its tier-forming position for transferring bales being arranged in one of said plurality of tier patterns onto said load bed;
bale-receiving means mounted on said chassis along a bale-receiving end of said tier-forming table and including means moveable from a bale-receiving position to a bale-discharging position adjacent said bale-receiving end of said tier-forming table and back to its bale-receiving position for successively transferring bales onto said tier-forming table;
means associated with said tier-forming table and said moveable means of said bale-receiving means and operable in any one of a plurality of modes for causing successive transfer of bales by said moveable means to said tier-forming table and arrangement of said bales thereon into a corresponding one of said plurality of tier patterns; and
means responsive to movement of said tier-forming table from its tier-forming position to its tier-discharging position for selecting one of said plurality of modes for said operable means during the next following tier-forming operation.

16. A bale wagon for alternatively forming bales into a pair of tier patterns, comprising:
a chassis;
a load-carrying bed mounted on said chassis;
a tier-forming table mounted on said chassis and being moveable from a tier-forming position to a tier-discharging position adjacent a tier-receiving end of said load bed and back to its tier-forming position for transferring bales being arranged in one of said pair of tier patterns onto said load bed;
bale-receiving means mounted on said chassis along a bale-receiving end of said tier-forming table and including means moveable from a bale-receiving position to a bale-discharging position adjacent said bale-receiving end of said tier-forming table and back to its bale-receiving position for successively transferring bales onto said tier-forming table;
means associated with said tier-forming table and said moveable means of said bale-receiving means and operable in either one of two modes for causing successive transfer of bales by said moveable means to said tier-forming table and arrangement of said bales thereon into either one of said pair of tier patterns; and
means responsive to movement of said tier-forming table from its tier-forming position to its tier-discharging position for alternatively selecting one of said two modes for said operable means.

* * * * *

UNITED STATES PATENT OFFICE
CERTIFICATE OF CORRECTION

Patent No. 3,908,833    Dated September 30, 1975

Inventor(s) Anthony E. Furtado, Thomas H. Wadsworth and L. Dennis Butler

It is certified that error appears in the above-identified patent and that said Letters Patent are hereby corrected as shown below:

Column 1, line 32, delete "capale" and insert --capable--.

Column 2, line 15, after "of" insert --the--.

Column 4, line 25, delete "determing" and insert --determining--;

line 49, delete "32" and insert --31--;

line 63, delete "opertions" and insert --operations--.

Column 6, line 7, delete "Patent" and insert --patent--;

line 29, delete "bracket" and insert --brackets--.

Column 7, line 37, delete "wageon" and insert --wagon--.

Column 8, line 25, delete "veiw" and insert --view--.

Column 9, line 21, delete "apir" and insert --pair--.

Column 11, line 29, delete "fron" and insert --front--.

Column 24, line 40, delete "slected and insert --selected--.

Column 27, line 22, delete "not" and insert --now--.

Column 28, line 28, delete "plaforms" and insert --platforms--;

line 39, delete "roll of" and insert --roll off--.

UNITED STATES PATENT OFFICE
CERTIFICATE OF CORRECTION

Patent No. 3,908,833            Dated September 30, 1975

Inventor(s) Anthony E. Furtado, Thomas H. Wadsworth and L. Dennis Butler

It is certified that error appears in the above-identified patent and that said Letters Patent are hereby corrected as shown below:

Column 29, line 7, delete "s" and insert --S--;

line 16, delete "formward" and insert --forward--.

Column 30, line 11, delete "pitoval" and insert --pivotal--.

Column 31, line 1, delete "receivingg" and insert --receiving--;

line 43, delete "pair" and insert --pairs--.

Column 32, line 9, delete "alinged" and insert --aligned;

line 26, delete "horizintal" and insert --horizontal--.

Column 33, line 9, after "position" insert --to its upright position and back to its horizontal position.--.

Column 34, line 54, delete "in" and insert --is--.

Column 35, line 18, delete "haf" and insert --half--.

Signed and Sealed this seventeenth Day of February 1976

[SEAL]

Attest:

RUTH C. MASON
*Attesting Officer*

C. MARSHALL DANN
*Commissioner of Patents and Trademarks*